US009744719B2

(12) United States Patent
Shome et al.

(10) Patent No.: US 9,744,719 B2
(45) Date of Patent: Aug. 29, 2017

(54) METHOD AND APPARATUS FOR REPAIRING COMPOSITE MATERIALS

(71) Applicant: The Boeing Company, Chicago, IL (US)

(72) Inventors: Moushumi Shome, Kent, WA (US); Adriana Willempje Blom, Shoreline, WA (US); Sahrudine Apdalhaliem, Seattle, WA (US); Waeil M. Ashmawi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/407,216

(22) Filed: Jan. 16, 2017

(65) Prior Publication Data
US 2017/0120512 A1 May 4, 2017

Related U.S. Application Data

(62) Division of application No. 14/276,918, filed on May 13, 2014, now Pat. No. 9,545,782.

(51) Int. Cl.
B29C 65/48 (2006.01)
B29C 65/00 (2006.01)
(Continued)

(52) U.S. Cl.
CPC ...... *B29C 66/9141* (2013.01); *B29C 35/0805* (2013.01); *B29C 65/1425* (2013.01); *B29C 65/1467* (2013.01); *B29C 65/4835* (2013.01); *B29C 65/5021* (2013.01); *B29C 65/5028* (2013.01); *B29C 65/5057* (2013.01); *B29C 66/0342* (2013.01); *B29C 66/12463* (2013.01);
(Continued)

(58) Field of Classification Search
CPC ............... B29C 35/08; B29C 65/1425; B29C 66/91216; B29C 66/9161; B29C 73/10; B29C 73/12; B29C 73/34; B29C 2035/0855; B32B 37/0046; B32B 37/18; B32B 37/182; B32B 38/0008; B32B 43/00
USPC ............................................. 156/64, 94, 98
See application file for complete search history.

(56) References Cited

U.S. PATENT DOCUMENTS 5,078,821 A 1/1992 Garvey et al.
5,833,795 A 11/1998 Smith et al.
(Continued)

FOREIGN PATENT DOCUMENTS

DE 2813874 A1 10/1978
DE 202009007118 U1 11/2010
(Continued)

OTHER PUBLICATIONS

Zhou, Shuangjie, and Hawley, Martin C., "A study of microwave reaction rate enhancement effect in adhesive bonding of polymers and composites", Composite Structures, 2003, vol. 61, No. 4, pp. 303-309.
(Continued)

*Primary Examiner* — George Koch
(74) *Attorney, Agent, or Firm* — Kolisch Hartwell, P.C.

(57) ABSTRACT

A method of bonding materials may comprise defining a bond interface between two materials in a cure zone on a surface of an object, and non-conductively heating the bond interface without directly heating the surface outside of the cure zone. Non-conductively heating the bond interface may involve applying microwave radiation to the bond interface.

19 Claims, 11 Drawing Sheets

(51) Int. Cl.

| | |
|---|---|
| *B32B 41/00* | (2006.01) |
| *B32B 37/00* | (2006.01) |
| *B29C 65/50* | (2006.01) |
| *B29C 35/08* | (2006.01) |
| *B29C 65/14* | (2006.01) |
| *B29C 73/10* | (2006.01) |
| *B29C 73/12* | (2006.01) |
| *B29C 73/34* | (2006.01) |
| *B32B 37/06* | (2006.01) |
| *B29K 101/10* | (2006.01) |
| *B29K 63/00* | (2006.01) |
| *B29K 105/00* | (2006.01) |
| *B29L 31/30* | (2006.01) |

(52) U.S. Cl.
CPC .... *B29C 66/7212* (2013.01); *B29C 66/72141* (2013.01); *B29C 66/72323* (2013.01); *B29C 66/91216* (2013.01); *B29C 66/91221* (2013.01); *B29C 66/91411* (2013.01); *B29C 66/91443* (2013.01); *B29C 66/949* (2013.01); *B29C 66/961* (2013.01); *B29C 66/9672* (2013.01); *B29C 73/10* (2013.01); *B29C 73/12* (2013.01); *B29C 73/34* (2013.01); *B32B 37/0046* (2013.01); *B32B 37/06* (2013.01); *B32B 41/00* (2013.01); *B29C 2035/0855* (2013.01); *B29K 2063/00* (2013.01); *B29K 2101/10* (2013.01); *B29K 2105/0097* (2013.01); *B29L 2031/3082* (2013.01); *B29L 2031/3085* (2013.01); *B29L 2031/3091* (2013.01)

(56) References Cited

U.S. PATENT DOCUMENTS

| | | |
|---|---|---|
| 8,468,709 B2 | 6/2013 | Akdeniz et al. |
| 8,490,348 B2 | 7/2013 | Wilenski et al. |
| 8,642,168 B2 | 2/2014 | Chakrabarti |
| 2004/0226648 A1 | 11/2004 | Gupte et al. |
| 2011/0198020 A1 | 8/2011 | Marengo et al. |
| 2013/0037198 A1 | 2/2013 | Safai et al. |

FOREIGN PATENT DOCUMENTS

| | | |
|---|---|---|
| DE | 102011076463 A1 | 11/2012 |
| DE | 102012207468 A1 | 11/2013 |

OTHER PUBLICATIONS

Yusoff, R., Aroua, M. K., Nesbitt, A., and Day, R. J., "Curing of polymeric composites using microwave resin transfer moulding (RTM)", Journal of Engineering Science and Technology, Aug. 2007, vol. 2, No. 2, pp. 151-153, School of Engineering, Taylor's University College.

Kwak, M., Robinson, P., Bismarck, A., and Wise, R., "Curing of composite materials using the recently developed hephaistos microwave", In 18th International Conference on Composite Materials, 2011, pp. 21-26.

TWI Limited, Novel tooling for composites curing under microwave heating—Project 'Mu-Tool', Dec. 13-14, 2011, 16 pages, Loiretech, Nantes, France.

European Patent Office, Extended European Search Report regarding European Patent Application No. 15162145.5, Oct. 9, 2015, 9 pages.

U.S. Patent and Trademark Office, Office action regarding U.S. Appl. No. 14/276,918, Apr. 21, 2016, 27 pages.

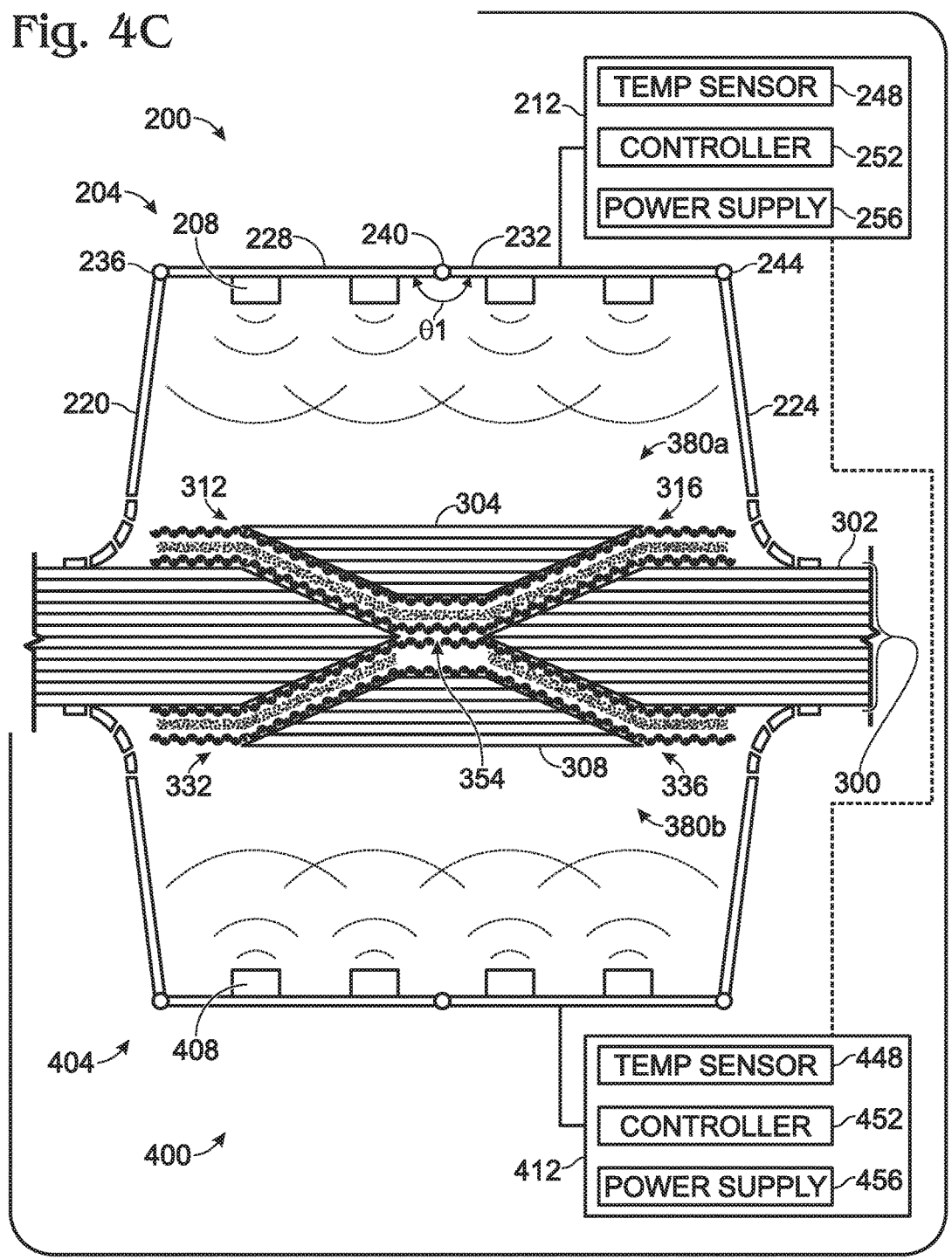

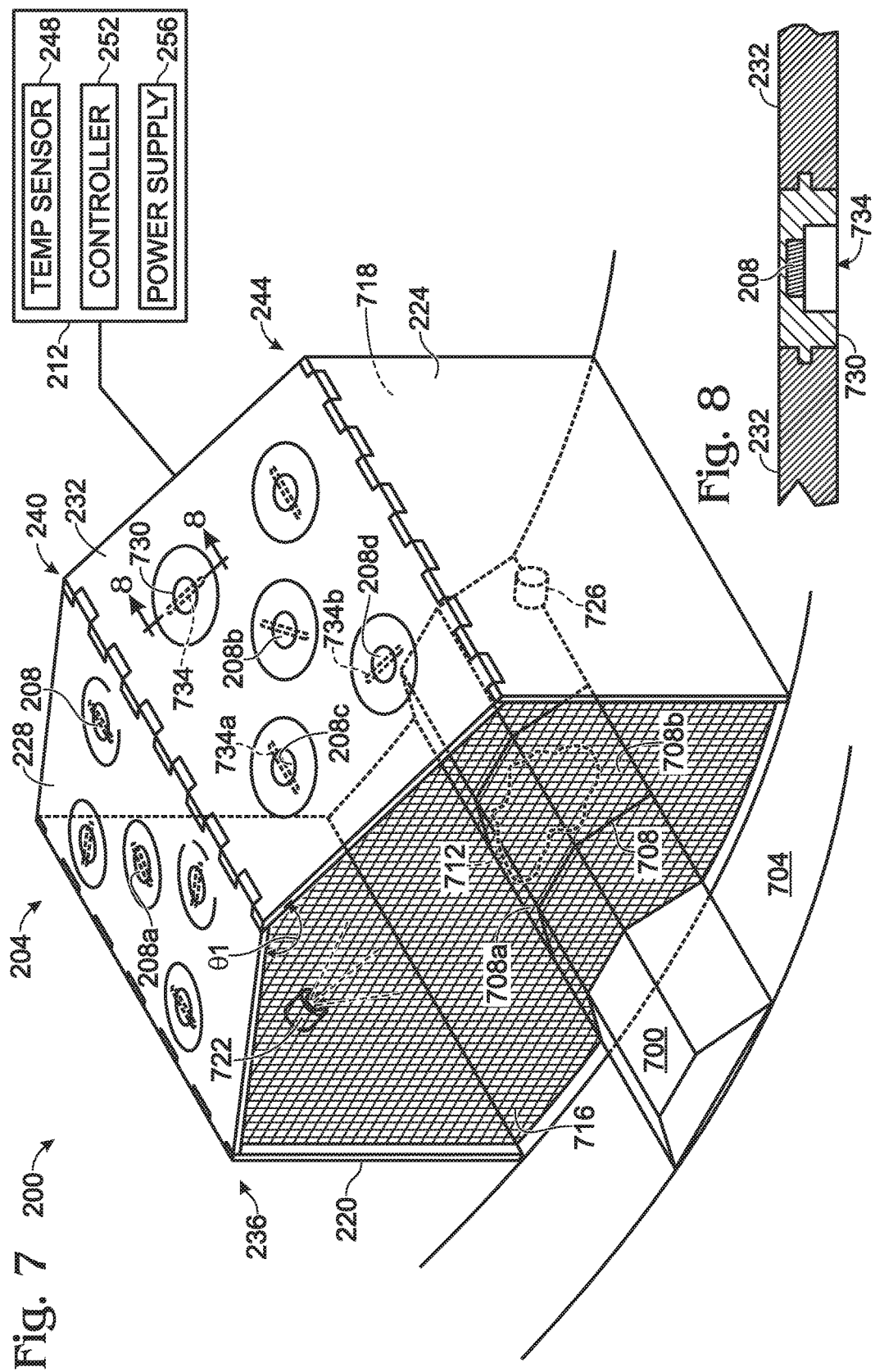

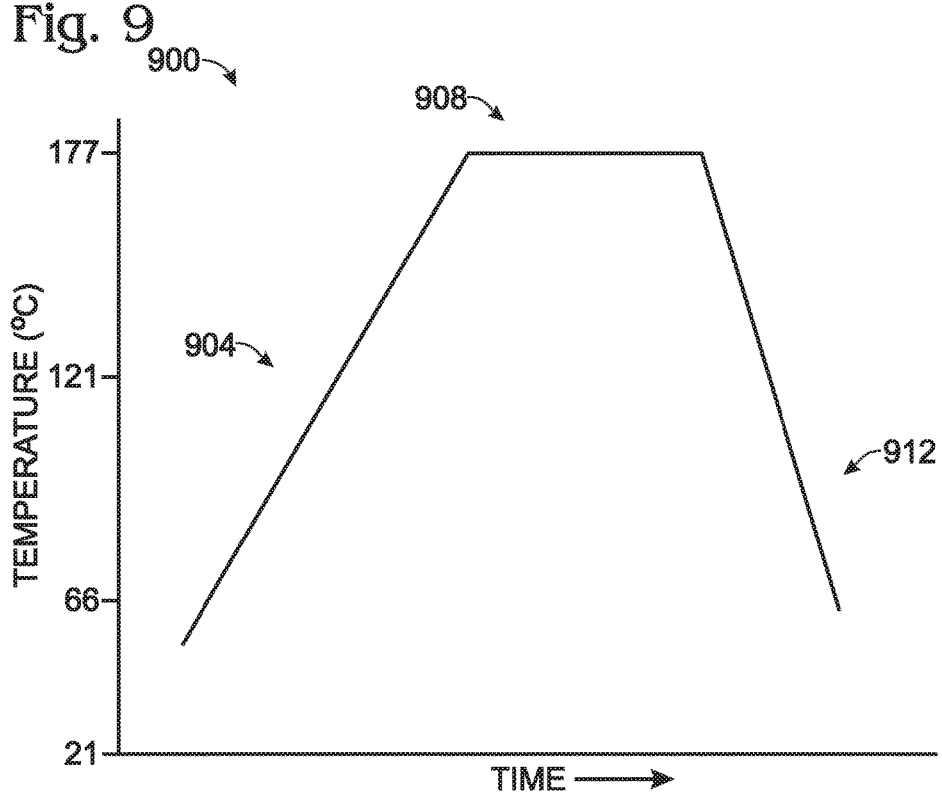
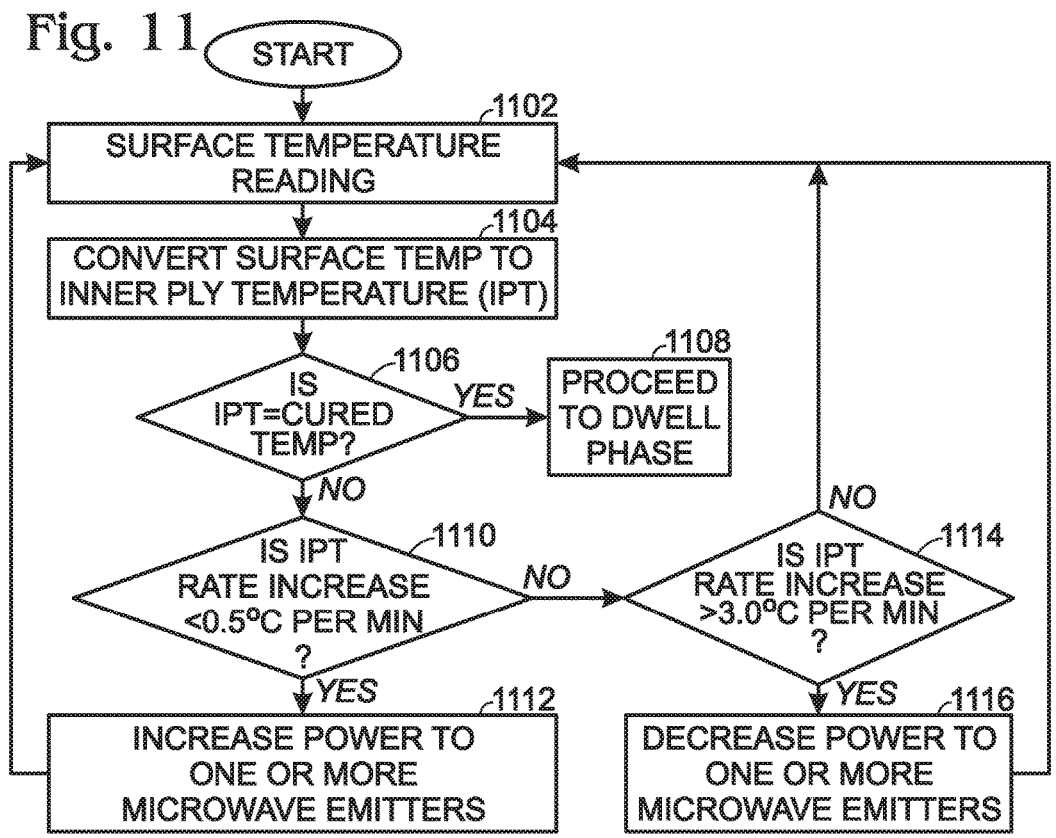

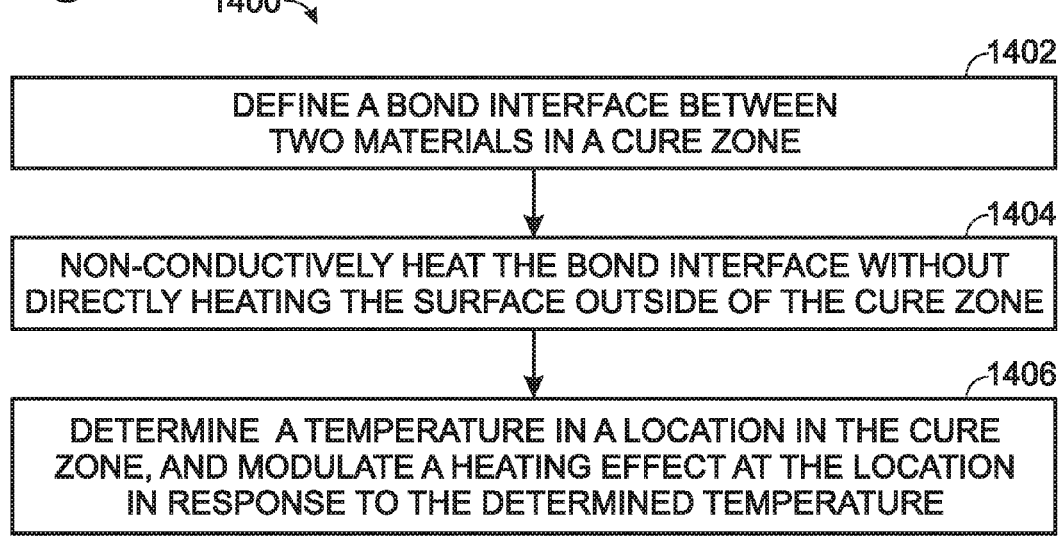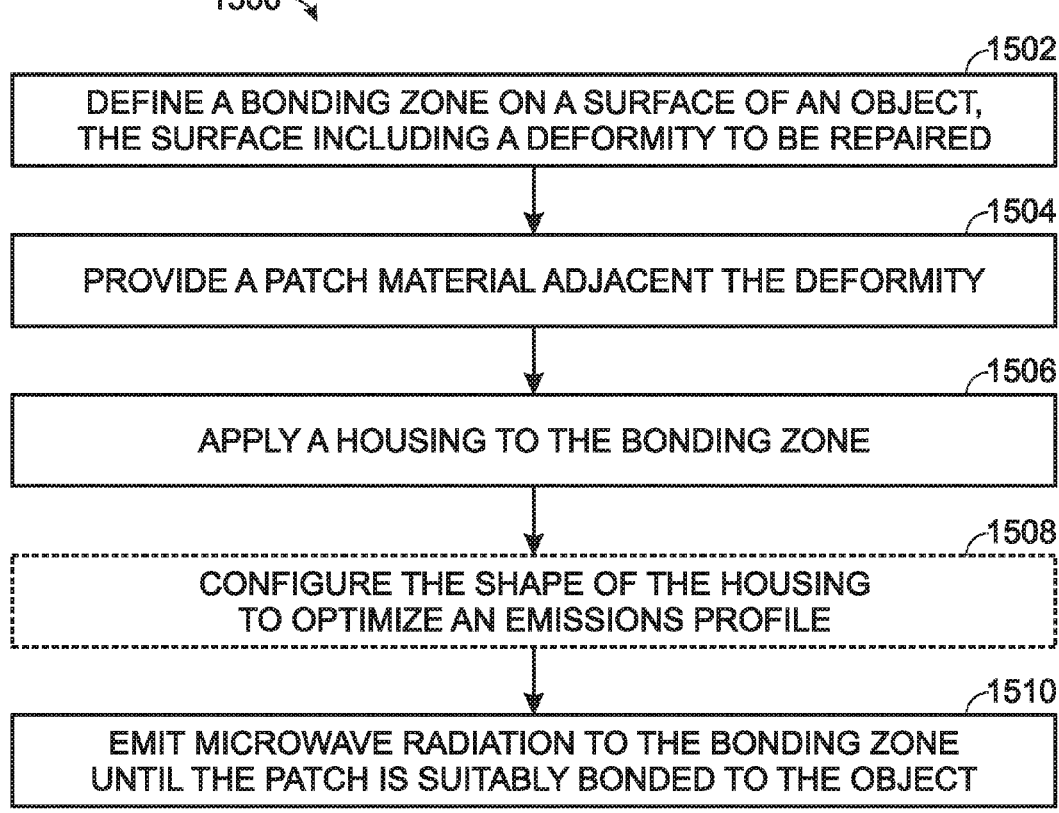

METHOD AND APPARATUS FOR REPAIRING COMPOSITE MATERIALS

CROSS-REFERENCES TO RELATED APPLICATIONS

This application is a divisional application of U.S. patent application Ser. No. 14/276,918, filed May 13, 2014 now U.S. Pat. No. 9,545,782. The complete disclosure of the above-identified patent application is hereby incorporated by reference for all purposes.

FIELD

This disclosure relates to composite materials, and more specifically to apparatuses and methods for heating a bond portion of a composite material.

BACKGROUND

Composite materials are typically made from two or more constituent materials with significantly different physical or chemical properties. Typically, the constituent materials include a matrix (or bond) material, such as resin (e.g., thermoset epoxy), and a reinforcement material, such as a plurality of fibers (e.g., a woven layer of carbon fibers). When combined, the constituent materials typically produce a composite material with characteristics different from the individual constituent materials even though the constituent materials generally remain separate and distinct within the finished structure of the composite material. Carbon-fiber-reinforced polymer is an example of such a composite material.

Composite materials may be preferred for many reasons. For example, composite materials may be stronger and/or lighter than traditional materials. As a result, composite materials are generally used to construct various objects such as vehicles (e.g., airplanes, automobiles, boats, bicycles, and/or components thereof), and non-vehicle structures (e.g., buildings, bridges, swimming pool panels, shower stalls, bathtubs, storage tanks, and/or components thereof).

Occasionally, these composite materials may become damaged, in which case it may be preferable to repair the damaged composite material rather than replace it entirely. Currently, composite repairs are performed with heat blankets that locally (or in-situ) cure matrix material onto the existing damaged composite. However, there are various problems associated with using heat blankets, such as uneven heating, misplaced heating, slow heating speeds, long cure times, thermal runaways, and/or a lack of adequate temperature control.

SUMMARY

A method of bonding materials may comprise defining a bond interface between two materials in a cure zone on a surface of an object, and non-conductively heating the bond interface without directly heating the surface outside of the cure zone.

Another method of bonding materials may comprise defining a bonding zone on a surface of an object. The surface may include a deformity to be repaired. A patch material may be provided adjacent the deformity. A housing may be applied to the bonding zone. The housing may have at least one microwave emitter on an inner side. The emitter may be directed toward the bonding zone. The housing may be configured to prevent microwave emitter radiation from reaching the surface outside of the bonding zone. Microwave radiation may be emitted to the bonding zone until the patch is suitably bonded to the object.

An apparatus for bonding material may comprise a housing and one or more microwave emitters. The housing may have an inner side and an opening. The one or more microwave emitters may be on the inner side of the housing. The housing may be configured for mounting on a surface having a fault requiring repair. The opening of the housing may be adjacent the surface, and may surround the fault. The housing and the surface may form a substantially closed chamber.

The present disclosure provides various apparatuses, and methods of use thereof. In some embodiments, an apparatus may include a heating device, a spacing mechanism, and a shielding mechanism. In some embodiments, the heating device may be a non-conductive, non-convective heating device, such as one or more microwave emitters. In some embodiments, the spacing and shielding mechanisms may be a housing to which the one or more microwave emitters may be coupled. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4C is a schematic illustration of the apparatus of FIG. 3C in a reconfigured state, and a second apparatus similar to the apparatus of FIG. 3C, with the apparatuses coupled to the prepared damaged surface of FIG. 4B to heat respective bond interfaces between the patches and the prepared damaged surface.

FIG. 7 is a semi-schematic perspective illustration of the apparatus of FIG. 3C in another reconfigured state, and showing temperature sensors and polarizing mechanisms coupled to the housing.

FIG. 8 is a cross-sectional illustration of the apparatus of FIG. 7 taken along the line 8-8.

FIG. 9 is a chart of an illustrative bond cure cycle.

FIG. 11 is an illustration of operations performed by one embodiment of a feedback loop for the non-conductive heat ramp-up phase.

FIG. 14 is a flowchart illustrating another method for bonding materials.

FIG. 15 is a flowchart illustrating yet another method for bonding materials.

DESCRIPTION

Overview

Various embodiments of apparatuses and methods for bonding materials are described below and illustrated in the associated drawings. Unless otherwise specified, an apparatus or method and/or their various components or steps may, but are not required to, contain at least one of the structures, components, functionality, and/or variations described, illustrated, and/or incorporated herein. Furthermore, the structures, components, functionalities, and/or variations described, illustrated, and/or incorporated herein in connection with the apparatuses and methods may, but are not required to, be included in other similar apparatuses or methods. The following description of various embodiments is merely exemplary in nature and is in no way intended to limit the disclosure, its application or uses. Additionally, the advantages provided by the embodiments, as described below, are illustrative in nature and not all embodiments provide the same advantages or the same degree of advantages.

SPECIFIC EXAMPLES, MAJOR COMPONENTS, AND ALTERNATIVES

Example 1

Figure 1:
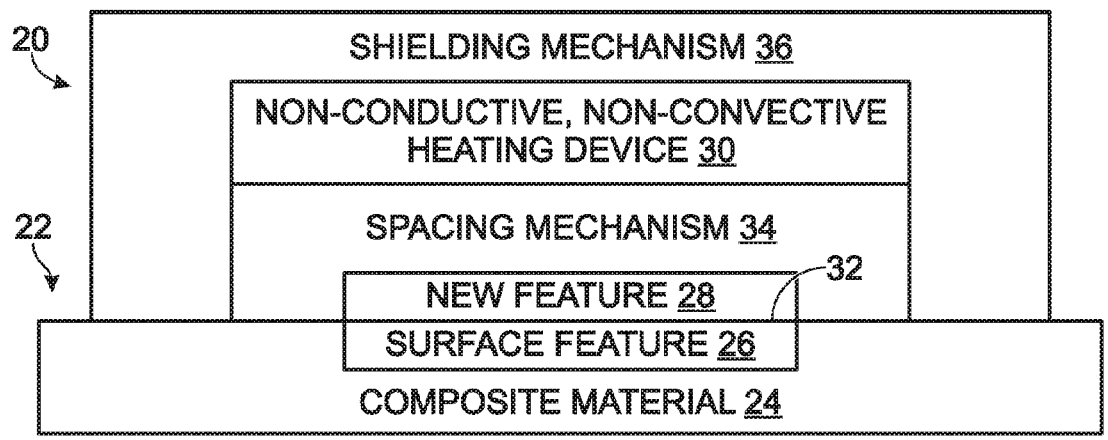
FIG. 1 is a block diagram of an illustrative apparatus and an illustrative object.

This example describes an illustrative apparatus for bonding materials to an object; see FIG. 1.

FIG. 1 is a schematic diagram of an apparatus, generally indicated at 20, and an object, generally indicated at 22. Object 22 may include a component made of a composite material 24. Composite material 24 may have a surface feature 26. Apparatus 20 may be coupled to composite material 24 to bond a new feature 28 to surface feature 26. In some embodiments, surface feature 26 may be a fault in composite material 24, in which case, new feature 28 may be a repair patch, and surface feature 26 may be prepared and/or altered before new feature 28 is bonded to composite material 24.

Apparatus 20 may include a non-conductive, non-convective heating device 30. For example, heating device 30 may include one or more microwave emitters (e.g., one or more magnetrons). The one or more microwave emitters may be operable to emit microwave radiation to non-conductively and non-convectively heat a bond interface 32 between new feature 28 and surface feature 26. Bond interface 32 may include a bond portion of a composite, such as a layer of thermo-curable (or thermo-setting) matrix material. Device 30 may suitably heat the bond portion to cure the bond portion, and thus bond new feature 28 to pre-existing composite material 24.

Apparatus 20 may include a spacing mechanism 34 to provide a suitable spacing between device 30 and bond interface 32. For example, microwave radiation emitted from device 30 may have a wavelength $\lambda$, in which case the suitable spacing provided by mechanism 34 may be at least $\lambda/4$. The spacing provided by mechanism 34 may, in some embodiments, be less than $\lambda/4$. However, microwave heating is generally greatest at odd multiples of $\lambda/4$ (e.g., $\lambda/4$, $3\lambda/4$, $5\lambda/4$, etc.). Thus, if the provided spacing is less than one quarter of a wavelength (e.g., $\lambda/5$), then heating bond interface 32 to a suitable degree may involve operating device 30 for a longer period of time and/or emitting radiation having a greater amplitude.

In some embodiments, mechanism 34 may be disposed between device 30 and bond interface 32. For example, mechanism 34 may be a layer of foam or plastic that is substantially microwave transparent. In other embodiments, mechanism 34 may be disposed external to the provided spacing. For example, mechanism 34 may be a frame or housing to which device 30 may be connected or coupled.

Apparatus 20 may include a shielding mechanism 36. Shielding mechanism 36 may be configured to substantially contain all (or most) of the emitted radiation between shielding mechanism 36 and composite material 24. For example, shielding mechanism 36 may be made of a material with a high loss factor, such as steel or aluminum. In some embodiments, shielding mechanism 36 may be a housing that provides the spacing between device 30 and bond interface 32.

Example 2

This example describes another illustrative apparatus for bonding materials to an object; see FIGS. 2-7.

Figure 2:
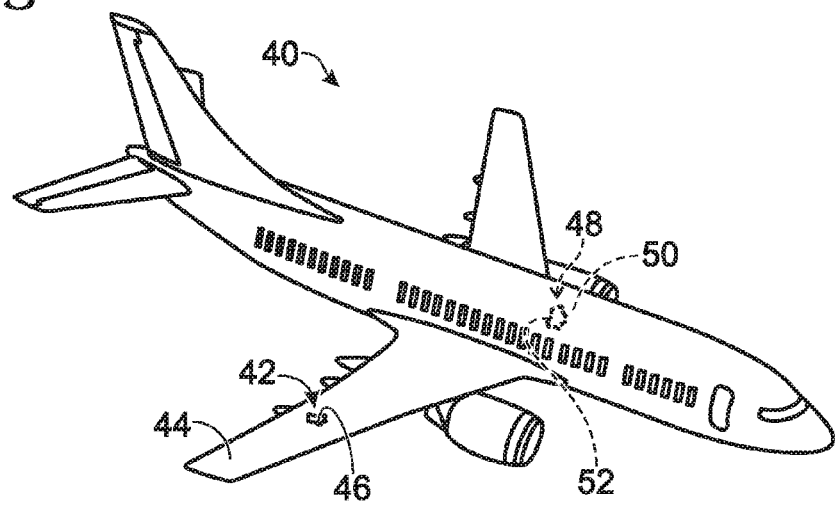
FIG. 2 is an illustration of an airplane having a damaged external surface and a damaged internal surface.

FIG. 2 depicts an illustrative object 40. Object 40 may include one or more components, such as fuselage skin, wing skin, a frame, a plurality of floor beams, and/or a plurality of horizontal stabilizers. The one or more components may be made of one or more composite materials, such as a laminate material, a honeycomb material, and/or one or more of the various exemplary composite materials described in U.S. Pat. Nos. 8,490,348 and 8,642,168, which are hereby incorporated by reference. While FIG. 2 shows object 40 to be an airplane, the object may be any other suitable structure, such as an automobile or a building.

In some cases, it may be desirable to define a bonding (or cure) zone on a portion of the object. For example, it may be desirable to define the bonding zone in order to add a new surface feature to an existing surface feature of one of the components of object 40. Examples of new surface features may include additional layers of reinforcement, and/or a new flange for mounting yet another feature. In the immediate example, it may be desirable to define a bonding zone 42 on an external surface 44 of object 40 in order to repair an existing surface feature, such as a fault (or deformity, or damaged area) 46. Alternatively or additionally, it may be desirable to define a bonding zone 48 on an internal surface 50 of object 40 to repair a fault 52. Fault 46 and/or fault 52 may be the result of an impact (e.g., from a technician dropping a tool on the surface, or a collision with another object), decompression stress, or fire damage, for example. In some cases, either of faults 46 or 52 may require repair in order for object 40 to be safely operated. In other cases, either of these faults may be a cosmetic fault that does not require repair, but may be a desirable repair nonetheless.

Figure 3A:
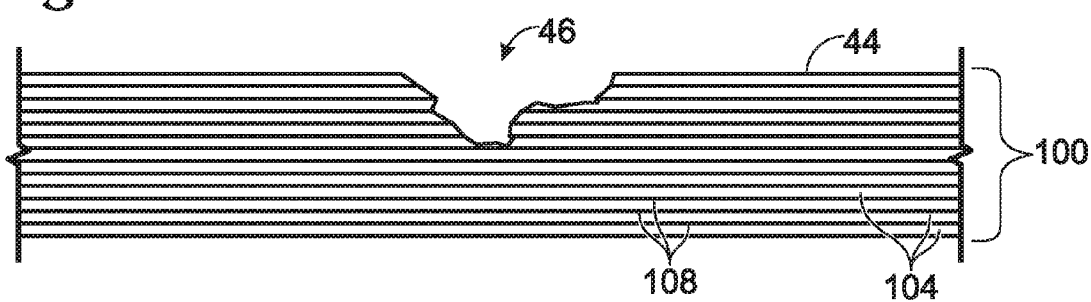
FIG. 3A is a cross-sectional illustration of the external damaged surface of FIG. 2.

FIG. 3A shows a cross-sectional view of fault 46 in surface 44 of the composite material, which is indicated here at 100. Material 100 may be a laminate including existing matrix material 104, such as a thermo-set adhesive or epoxy that has already been cured, and existing reinforcement material 108, such as a plurality of woven carbon fiber layers. In FIG. 3A, fault 46 is shown as an indentation (or breach) in surface 44 that extends through multiple layers of reinforcement material 108. In other examples, the fault may extend through a lesser or greater portion of material 100. For example, the fault may be a scratch in surface 44, or may be a hole extending all the way through the material (e.g., as in FIG. 4A).

Figure 3B:
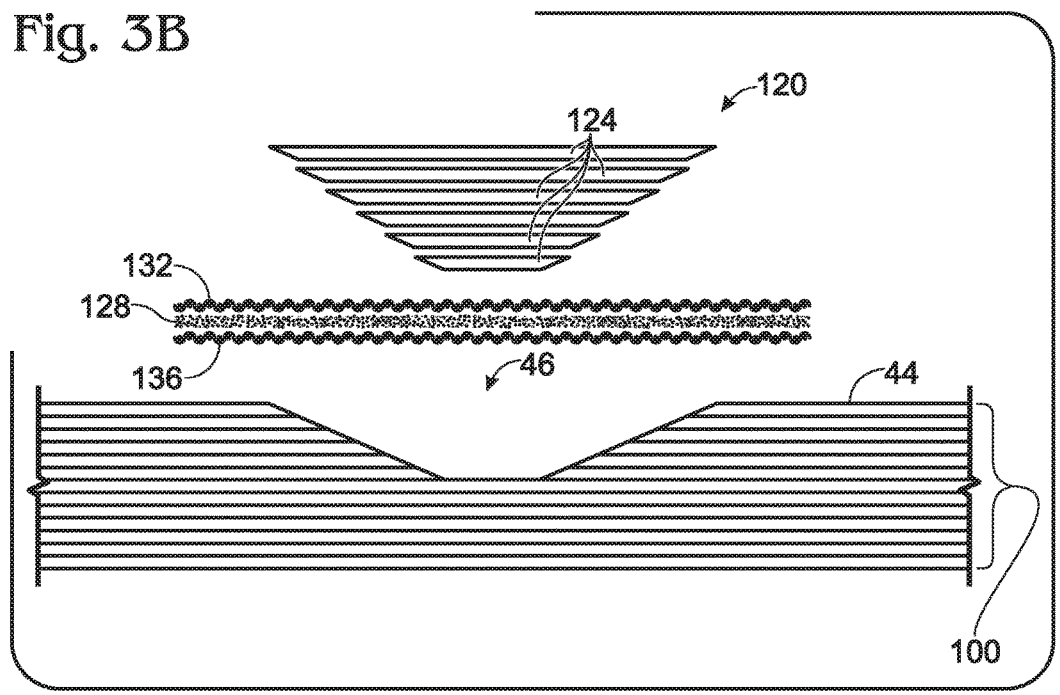
FIG. 3B is a cross-sectional illustration of the external damaged surface prepared for repair with a patch.

Preparing fault 46 for repair may involve removing a portion of composite material 100 (e.g., by sanding and/or grinding material 100 proximate fault 46). For example, preparing fault 46 may involve tapering the damaged area, as is shown in FIG. 3B. Preferably, edge portions of fault 46 may be tapered with a taper ratio of about 30:1 (e.g., so that an orientation of the edge may deviate from an orientation of surface 44 by only about 1.5 degrees). Fault 46 may then be cleaned with an approved solvent.

A patch (or patch material) 120 may be created by bonding together multiple repair plies 124 of composite material. Plies 124 may include alternating layers of matrix and reinforcement material, or any other suitable combination of materials.

Figure 3C:
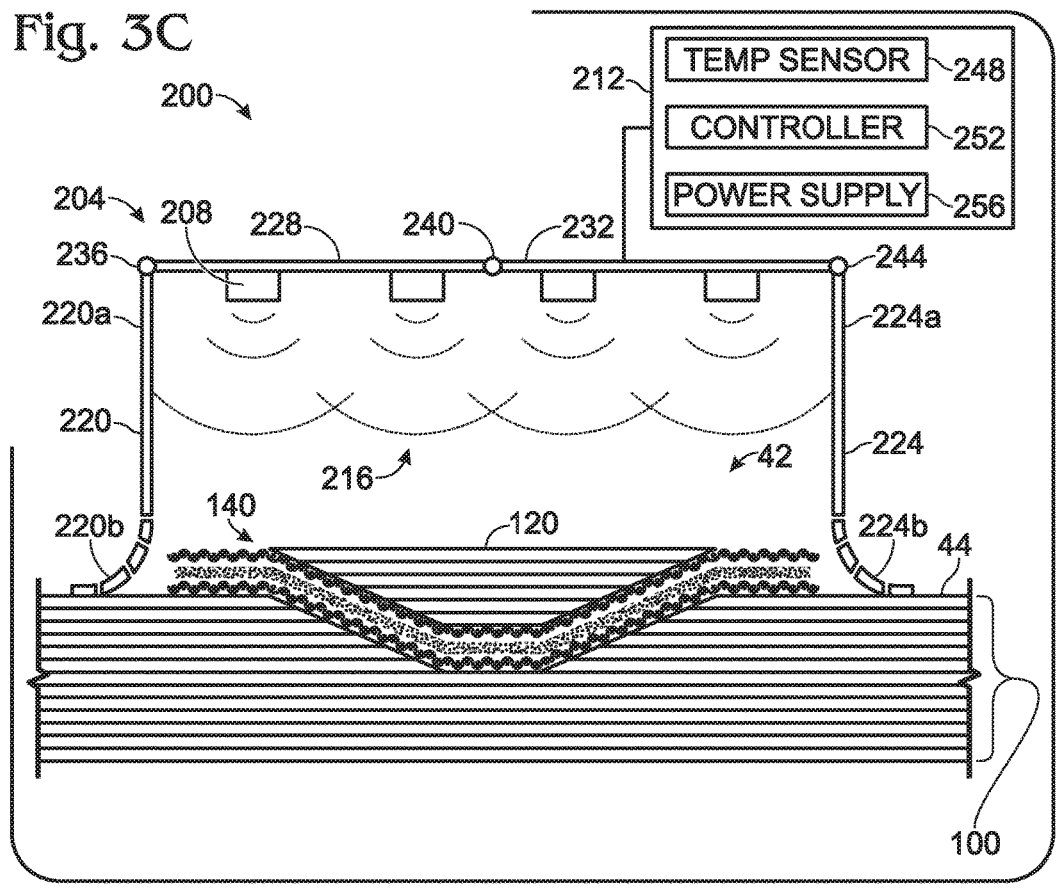
FIG. 3C is a schematic illustration of an apparatus including a housing coupled to the external damaged surface to heat a bond interface between the patch and the external damaged surface.

Patch 120 may be positioned adjacent fault 46. For example, a layer of adhesive film 128 may be disposed between first and second layers 132, 136 of positioning fabric. Film 128 may be a matrix material, such as a thermo-setting adhesive. Layers 132, 136 may be sheets of reinforcement material. Film 128 and layers 132, 136 may be positioned in fault 46, such that layer 136 contacts fault 46. Patch 120 may then be positioned in fault 46 (e.g., such that patch 120 contacts layer 132) to define a bond interface 140 between patch 120 and composite material 100, as shown in FIG. 3C. Film 128 may permeate layer 132 to contact patch 120, and may permeate layer 136 to contact composite material 100.

An apparatus, generally indicated at 200 in FIG. 3C, may be used to non-conductively heat bond interface 140. Apparatus 200 may heat bond interface 140 without directly heating surface 44 outside of bonding zone 42. Bonding zone 42 may be defined by containment of an area on surface 44 by apparatus 200.

Figure 3D:
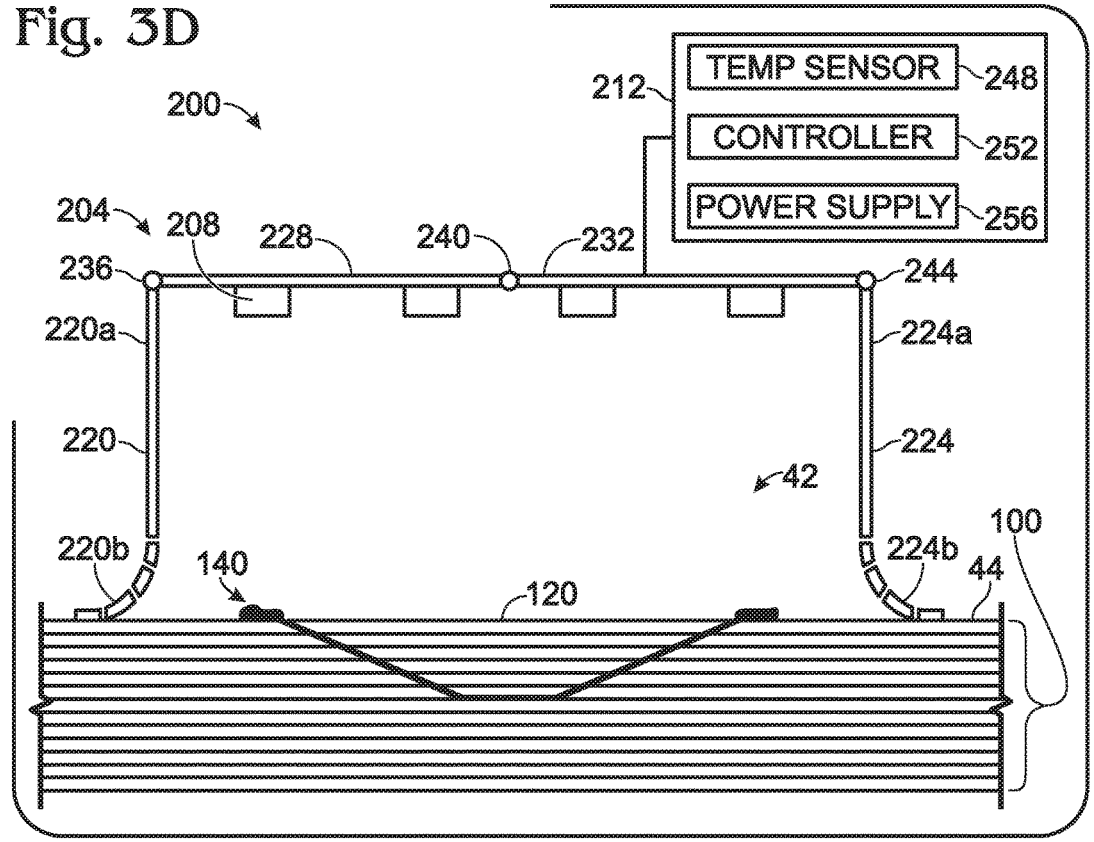
FIG. 3D is a schematic illustration similar to FIG. 3C, but showing the bond interface in a cured state.

Apparatus 200 may include a housing 204, one or more microwave emitters 208, and circuitry 212. Emitters 208 may be connected to housing 204. Housing 204 may be configured to direct emitters 208 toward bonding zone 42. Circuitry 212 may be used to selectively power emitters 208. When powered, emitters 208 may emit microwave radiation 216 toward bonding zone 42 to heat bond interface 140. Emitters 208 may emit radiation 216 to bonding zone 42 (e.g., to bond interface 140) until patch 120 is suitably bonded to composite material 100 of the object, as shown in FIG. 3D.

Referring back to FIG. 3C, housing 204 may be configured to at least partially enclose bonding zone (or repair area) 42 to substantially contain (all of) radiation 216 inside housing 204. For example, housing 204 may be configured to enclose bonding zone 42 to isolate bonding zone 42 from surface 44 outside of bonding zone 42, and/or from a space surrounding the housing. Such isolation may prevent radiation 216 from reaching surface 44 outside of bonding zone 42 and/or the space surrounding housing 204 which may be occupied by a technician. For example, housing 204 may be made of a material with a high loss factor. Housing 204 may have an inner side, an outer side, and an opening. Emitters 208 may be on (or connected to) the inner side of housing 204, as shown in FIG. 3C. Housing 204 may be configured to be mounted on (or coupled to) surface 44, such that the opening of housing 204 is adjacent surface 44 and surrounds the fault, and/or such that housing 204 and surface 44 form a substantially closed chamber, as is also shown in FIG. 3C.

In one example, housing 204 may include one or more panels, such as side panels 220, 224, and ceiling panels 228, 232. While multiple emitters 208 are shown connected to ceiling panels 228, 232, one or more emitters may alternatively or additionally be connected to side panels 220, 224. The one or more panels may include rigid and/or flexible portions. For example, ceiling panels 228, 232 may be substantially rigid. Side panels 220, 224 may include respective rigid portions 220a, 224a, and/or respective flexible portions 220b, 224b. Rigid portions 220a, 224a may be proximate ceiling panels 228, 232. Flexible portions 220b, 224b may be proximate the opening of housing 204, and may be configured to provide an adequate seal between apparatus 200 and surface 44. The adequate seal may not be "air tight", but rather may prevent radiation 216 from escaping the closed chamber. For example, the adequate seal may have gaps, but these gaps may have a maximum dimension that is smaller than the wavelength of radiation 216. Flexible portions 220b, 224b may be made of a wire mesh, or other flexible material, which may be configured to flexibly engage composite 100 (e.g., to provide the adequate seal). Holes in the wire mesh may be smaller than the wavelength of radiation 216.

Apparatus 200 may be configured to create a plurality of different volumes and/or shapes. For example, housing 204 may include one or more reconfiguration devices, such as hinges 236, 240, 244, operatively connected to the one or more panels. The one or more reconfiguration devices may allow the size and/or shape of housing 204 to be reconfigured (or customized) to accommodate various sizes and/or geometries or topographies of various surfaces, surface features, bonding zones, and/or bond interfaces. For example, hinge 236 may hingedly connect panel 220 and panel 228 to allow for an angle between panels 220, 228 to be adjusted. Similarly, hinge 240 may hingedly connect panel 228 and panel 232, and hinge 244 may hingedly connect panel 232 and panel 224. Adjusting the angles (or relative orientations) between the one or more panels may adjust the size of the opening of housing 204, which may result in a smaller or larger area of surface 44 being exposed to radiation 216. Additionally or alternatively, adjusting the angles may adjust a spacing provided between emitters 208 and bond interface 140, and/or an orientation of the one or more panels relative to bond interface 140 and/or to one or more of the other panels.

In some embodiments, housing 204 may additionally or alternatively include a continuous substantially flexible sheet, which may include an outer layer of high loss factor material.

Emitters 208 may be (or may include) one or more magnetrons. Emitters 208 may be configured to emit radiation (or microwaves) having a frequency in a range of about 2 GHz to 16 GHz, which may be suitable for heating a bond portion of the composite (e.g., the thermo-setting adhesive). Frequencies outside of this range may not be suitable, or may be less effective for suitably heating the bond portion. For example, frequencies significantly above 16 GHz may heat the bond portion too quickly, and frequencies significantly below 2 GHz may produce a heating profile with undesirably large cold spots.

Generally, maximum microwave heating occurs at a separation distance from emitters 208 corresponding to odd multiples of quarter wavelengths of the emitted radiation. Thus, apparatus 200 preferably provides a spacing of at least one quarter wavelength between emitters 208 and bond interface 140. Emitted radiation with a frequency of 2 GHz has a wavelength of about 14.99 cm, and emitted radiation with a frequency of 16 GHz has a wavelength of about 1.87 cm. Thus, a minimum provided spacing may be in a range of about 0.47 cm to 3.75 cm. In some embodiments, depending on the composition of the bond portion, topography of the bond interface, and/or the spacing and sealing provided by the apparatus, frequencies lower than 2 GHz and/or greater than 16 GHz may be suitable.

Circuitry 212 may include, at least one temperature sensor 248, a controller (or power controller) 252, and a power supply 256. Sensor 248 may be configured to measure a temperature of one or more locations inside bonding zone 42. For example, sensor 248 may include a thermocouple or infrared detector configured to measure an exposed surface temperature of patch 120, an exposed surface temperature of bond interface 140, and/or an exposed surface of surface 44 inside the closed chamber. Measurements from sensor 248 may be used to tailor (and/or monitor) the amount of radiation applied to bond interface 140, and in some embodiments may be used to avoid thermal runaways. Controller 252 may be configured for selectively powering emitters 208. For example, controller 252 may be configured to modulate power provided to emitters 208 from power supply 256 based on the temperature measurements from sensor 248 to modulate a heating rate of bond interface 140. Modulating the power provided to emitters 208 may include modulating a duty cycle of one or more of the emitters (e.g., modulating a frequency at which one or more of emitters 208 are turned off and on to modulate the heating rate), modulating an emission frequency of radiation 216 (e.g., modulating the frequency of radiation 216 to modulate the heating rate), and/or modulating an amplitude of radiation 216 (e.g., modulating the amplitude of radiation 216 to modulate the heating rate).

Figure 12:
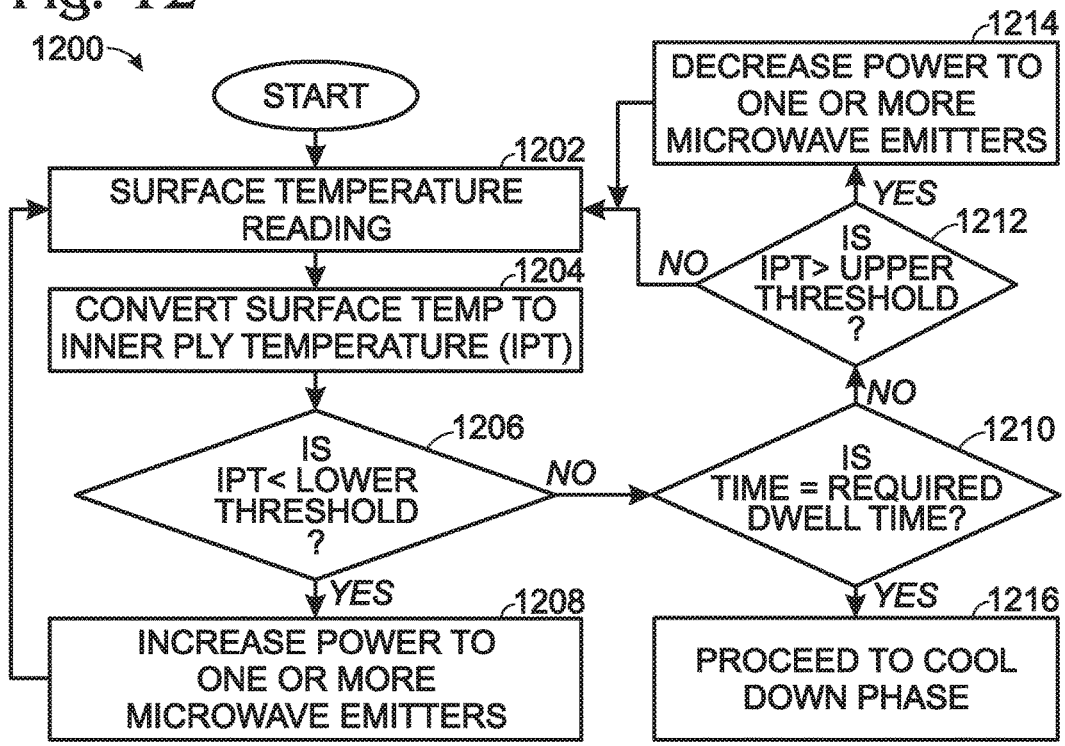
FIG. 12 is an illustration of operations performed by one embodiment of a feedback loop for the dwell phase.
Figure 13:
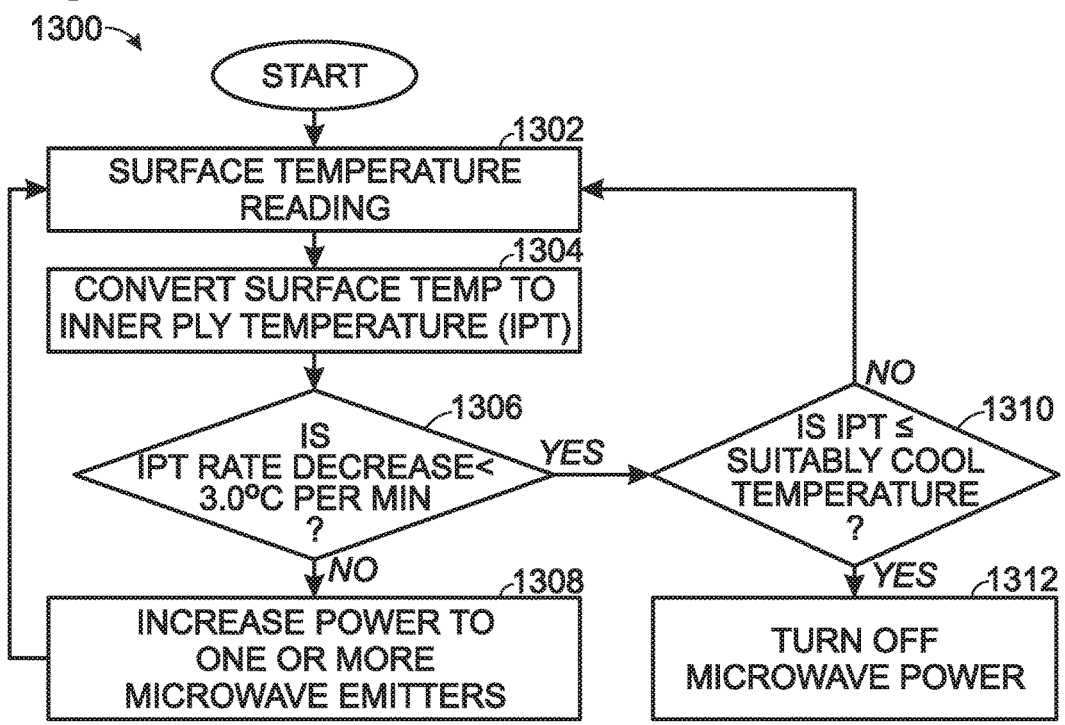
FIG. 13 is an illustration of operations performed by one embodiment of a feedback loop for the cool down phase.
Figure 16:
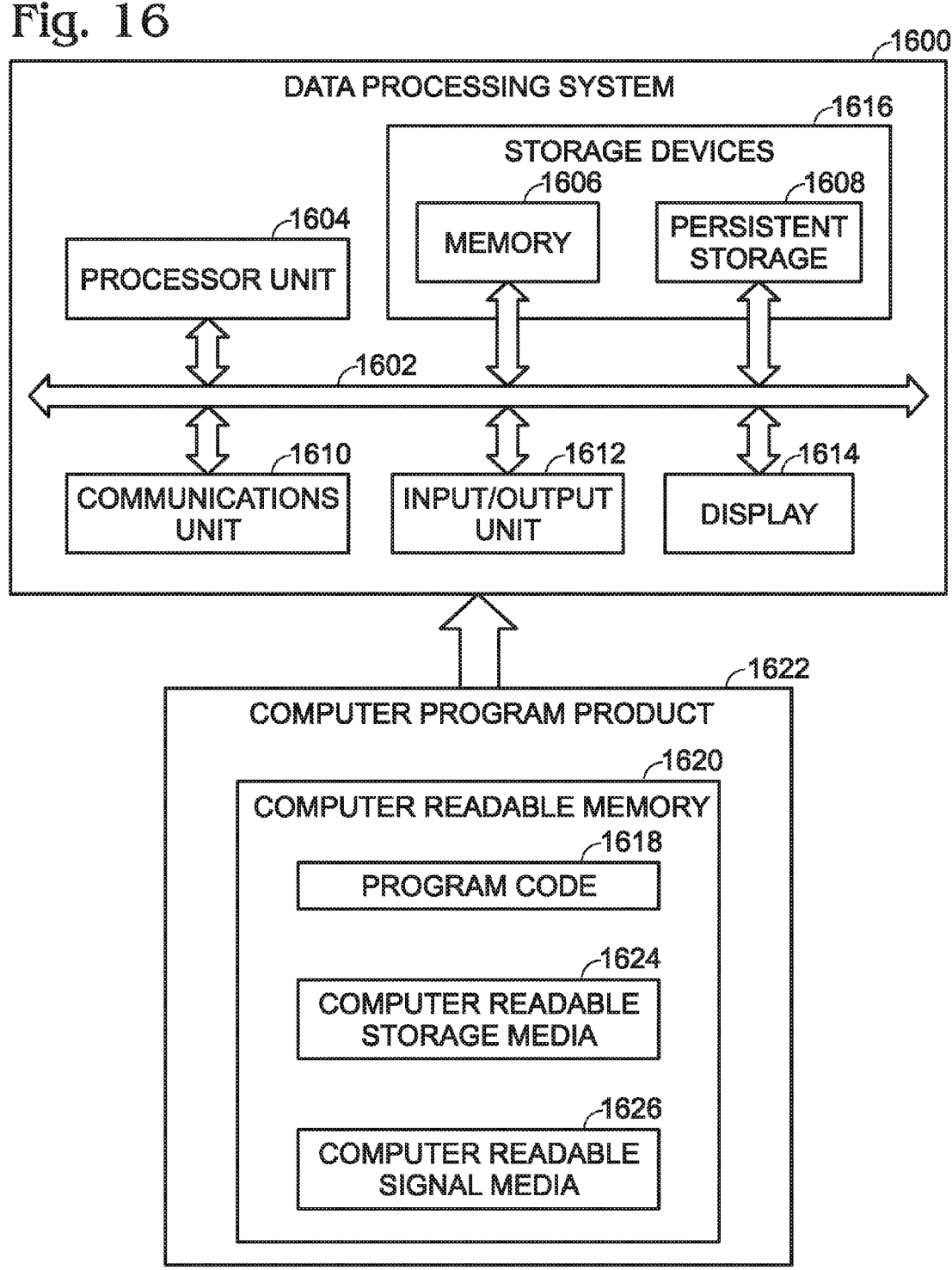
FIG. 16 is a schematic diagram of an illustrative data processing system.

Circuitry 212 may include a data processing system (e.g., as depicted in FIG. 16) which may implement one or more feedback loops (e.g., as depicted in FIGS. 11-13) to modulate and/or monitor the heating rate at which bond interface 140 is heated. In some embodiments, controller 252 may be programmed to implement the one or more feedback loops.

In some embodiments, apparatus 200 may be computer controlled. For example, the data processing system of circuitry 212 may be configured to allow a user to define a heating program. The heating program may include computer readable instructions corresponding to specific temperatures, for specific times, and/or for specific subzones within bonding zone 42 in order to accurately heat bond interface 140. The heating program may be defined based on a thermal survey of the object in the vicinity of bonding zone 42. In some embodiments, the data processing system may be configured to allow the user to select a heating program from a plurality of pre-defined (or predetermined, or pre-programmed) heating programs, rather than manually define the heating program. In some embodiments, the data processing system may be configured to allow the user to input a geometric dataset, such as a digital computer aided drafting (CAD) model. The geometric dataset may correspond to a portion of the object in the vicinity of bonding zone 42. Based on the geometric dataset, the data processing system may determine, select, and/or recommend a matching or optimum heating program.

FIG. 3D shows bond interface 140 after it has been suitably heated, which may correspond to a cured state of bond interface 140, such that patch 120 is sufficiently bonded to composite material 100.

Circuitry 212 may be configured to determine when bond interface 140 has been suitably heated. In response to a suitably heated determination, circuitry 212 may power down emitters 208. Circuitry 212 may be configured to indicate the suitably heated determination to the user. Circuitry 212 may be configured to indicate to the user that the emitters have been powered down and are no longer emitting microwave radiation. In response to either one of these indications, the user may remove (and/or uncouple) housing 204 from surface 44, and inspect the repair. In some embodiments, the user may sand or otherwise remove any undesirable artifacts (e.g., any bumps adjacent patch 120 that are not flush with surface 44).

Figure 4A:
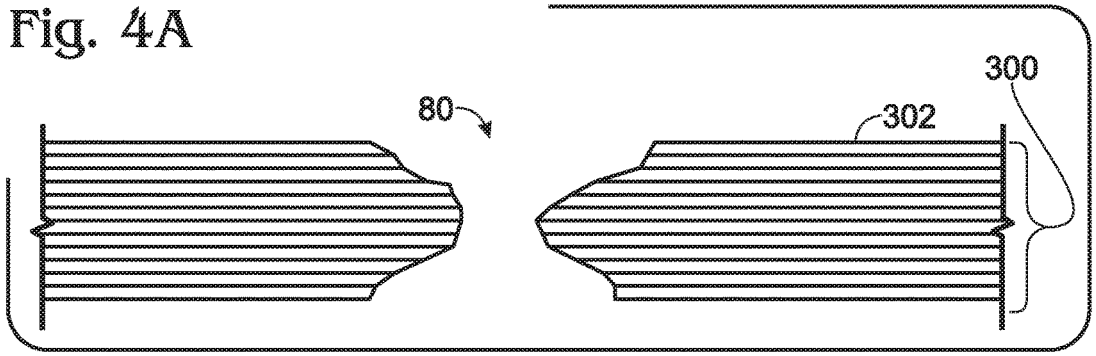
FIG. 4A is a cross-sectional illustration of another damaged surface.

After apparatus 200 is removed from surface 44, apparatus 200 may be used (and/or reconfigured) to repair another damaged area in a location remote from bonding zone 42, such as a surface feature 80 (see FIG. 4A), which may be any composite surface feature (or surface feature made of a composite material) anywhere on or in object 40, or other object, such as an automobile, boat, or building. Feature 80 is shown in FIG. 4A to be a fault. However, in other examples, the surface feature may not be a fault, but rather a location on (or in) the object to which it is desirable to heat (and/or cure) a composite bond interface to add a new article of manufacture.

As shown in FIG. 4A, feature 80 may be a hole that extends through a wall formed by a composite material 300 having a surface 302. Similar to material 100, material 300 may include one or more layers of reinforcement material laminated in matrix material.

Figure 4B:
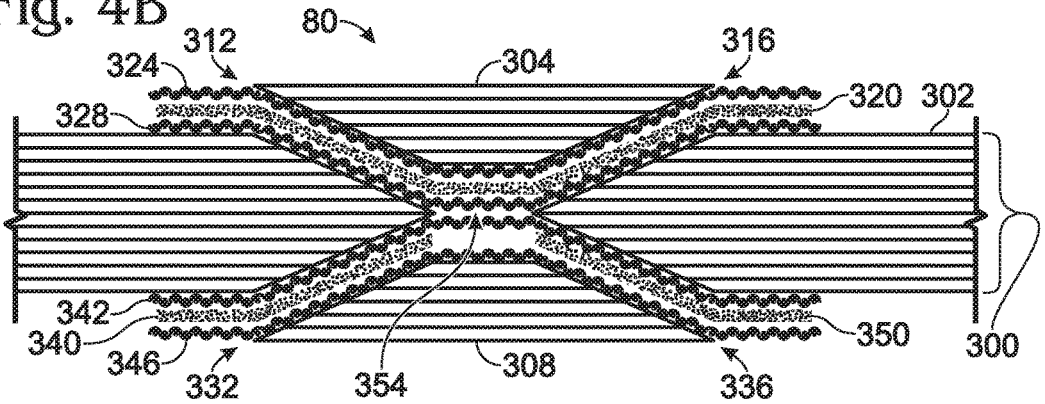
FIG. 4B is a cross-sectional illustration of the damaged surface of FIG. 4A prepared for repair with a pair of opposing patches.

As shown in FIG. 4B, edges of fault 80 may be prepared in a manner similar to fault 46 (see FIG. 3B). Patches 304, 308 may be created (and/or prepared) in a manner similar to patch 120 to repair fault 80. Patch 304 may be placed in fault 80 to define bond interfaces 312, 316 between patch 304 and material 300. For example, patch 304 may be placed in fault 80 with an adhesive film 320 and positioning fabric layers 324, 328 between patch 304 and material 300. Similarly, patch 308 may be placed in fault 80 to define bond interfaces 332, 336 between patch 308 and material 300. For example, an adhesive film 340 and positioning fabric layers 342, 346 may be sandwiched between patch 308 and material 300 to define bond interface 332, and an adhesive film 350 and positioning fabric layers 342, 346 may be sandwiched between patch 308 and material 300 to define bond interface 336. A bond interface 354 may be defined by positioning fabric layers 324, 328, 342, 346 and adhesive film 320 sandwiched between patches 304, 308. When sandwiched together adhesive films 320, 340, 350 may permeate through layers 324, 328, 342, and/or 346 to create a sufficient bond interface.

In FIG. 4C, apparatus 200 and an apparatus 400 are coupled to opposite sides of material 300 to define a bonding zone, which is shown here as including subzones 380a, 380b. Apparatuses 200, 400 may be coupled to material 300 with any suitable structure, mechanism, or device. For example, one or more fasteners such as one or more straps, adhesives, magnets, clamps, or other suitable structure may be used to couple either one of the apparatuses to material 300.

In FIG. 4C, apparatus 200 is shown in a reconfigured state, as compared to apparatus 200 in FIG. 3C. In FIG. 4C, side panels 220, 224 have been pivoted outward (via hinge connections provided by respective hinges 236, 244) to widen the opening of housing 204. Such a selective size adjustment (in this case a widening) may allow for apparatus 200 to be used to heat various bond interfaces having different widths. In some embodiments, reconfiguring or adjusting the shape of housing 204 may involve adjusting an angle θ1 between panels 228, 232, as shown in FIG. 7.

Referring back to FIG. 4C, apparatus 400 may be similar to apparatus 200 in structure and function. For example, apparatus 400 may include a housing 404, one or more microwave emitters 408, and circuitry 412. Housing 404 may be similar to housing 204. Emitters 408 may be similar to emitters 208. Circuitry 412 may be similar to circuitry 212. Circuitry 412 may include at least one temperature sensor 448 (e.g., which may be similar to sensor 248), a controller 452 (e.g., which may be similar to controller 252), and a power supply 456 (e.g., which may be similar to power supply 256).

Apparatuses 200, 400 may be operated to non-conductively heat bond interfaces 312, 316, 332, 336, 354 without directly heating surface 302 (or a surface of material 300 opposite surface 302 to which apparatus 400 is coupled) outside of bonding subzones 380a, 380b. For example, emitters 208, 408 may emit microwave radiation to bonding zones 380a, 380b until patches 304, 308 are suitably bonded to material 300. In some embodiments, circuitry 412 and circuitry 212 may be in communication with one another, which may improve feed back control of the apparatuses.

In FIG. 4C, housings 204, 404 have been configured to form a hexagonally shaped configuration around the bonding interfaces. Such a configuration may improve reflection of the emitted radiation off of the sides of the housings, which may more evenly distribute the emitted radiation across the bonding interfaces and/or reduce an occurrence of cold spots along the bond interfaces. In some embodiments, either of housings 204, 404 may be configured to form a hexagonally shaped chamber with the surface to which the respective housing is coupled. For example, side panels 220, 224 may each include a reconfiguration device that allows these panels to angle outward in a region proximal ceiling panels 228, 232, and to angle inward in a region proximal surface 302.

Figure 5:
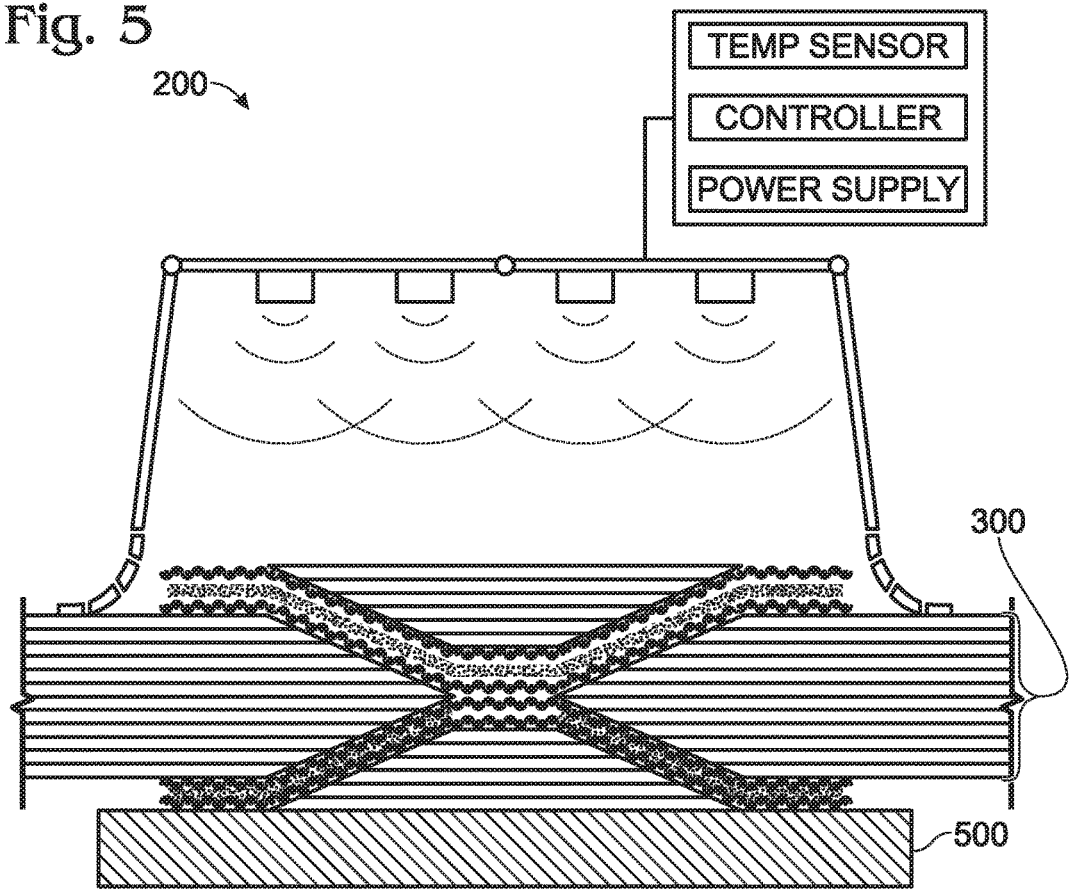
FIG. 5 is a schematic illustration of an alternative set-up for heating the respective bond interfaces between the patches and the prepared damaged surface.

FIG. 5 shows an alternative set-up for repairing material 300. In FIG. 5, material 300 may be prepared and patches may be applied in a similar manner to FIG. 4B. Apparatus 200 may be coupled to one side of material 300, and a tool 500 may be coupled to the other side of material 300 (e.g., opposite apparatus 200). Apparatus 200 may be operated to heat at least one of the bond interfaces formed between at least one of the patches and material 300 (and/or a bond interface formed between the patches). Tool 500 may support the patch (or patch portion) that is distal apparatus 200. Tool 500 may be configured to prevent microwave radiation from apparatus 200 from escaping the bonding zone opposite apparatus 200. In some embodiments, tool 500 may be used to prevent any microwave radiation from passing through material 100 (see FIG. 3C) opposite apparatus 200.

Heating the bond interfaces from a single side, as shown in FIG. 5, may be sufficient to adequately cure the bond interface. However, in some embodiments, apparatus 200 may be subsequently coupled to the opposite side to complete the curing process. In some embodiments, tool 500 may again be coupled to material 300 opposite the apparatus when completing the curing process.

Figure 6:
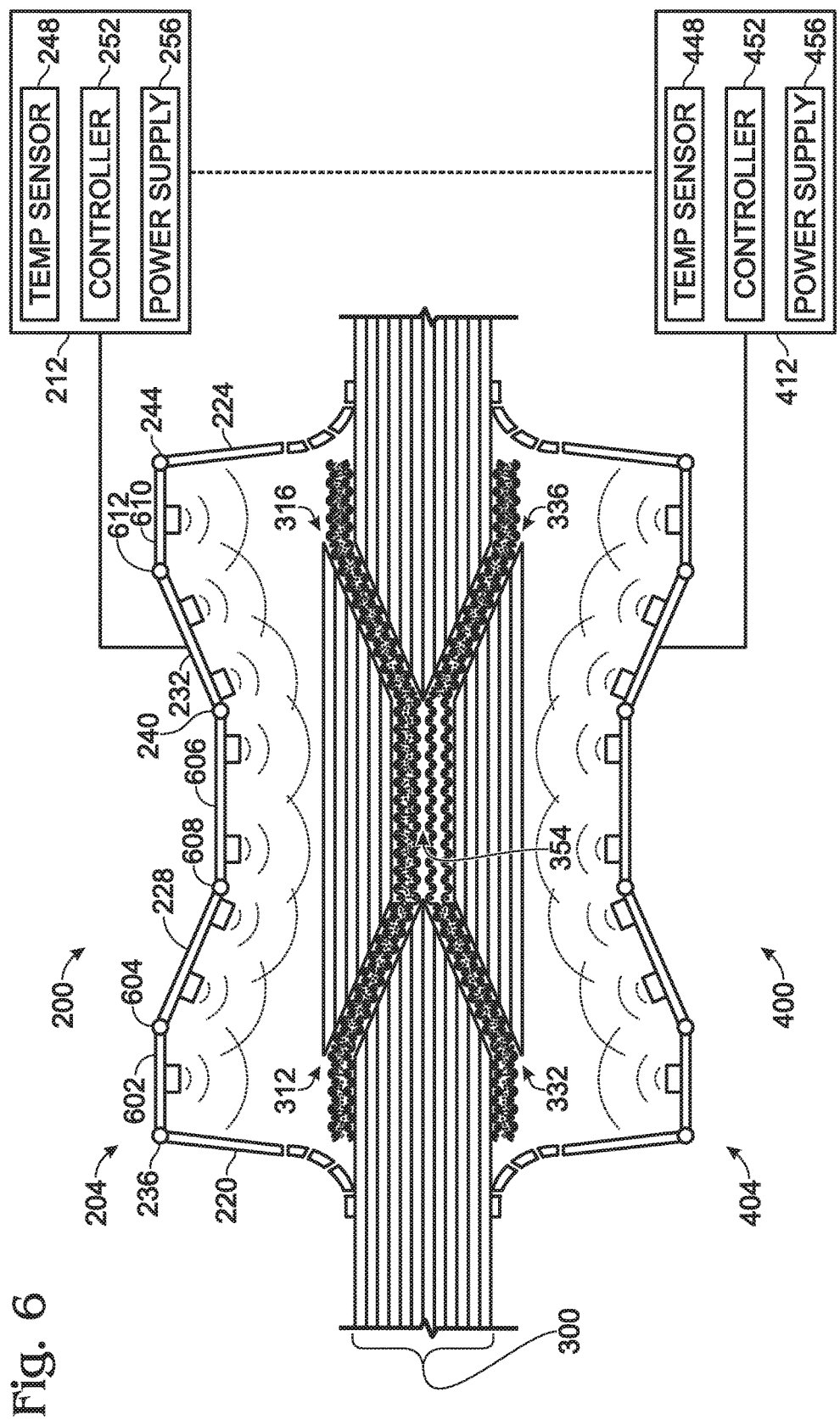
FIG. 6 is a schematic illustration of the two apparatuses of FIG. 3C reconfigured to optimize an emission profile to compliment a topography of the bond interfaces.

FIG. 6 shows apparatuses 200, 400 in reconfigured states to tailor (or optimize) an emission profile to compliment a topography of bond interfaces 312, 316, 332, 336, 354. In the immediate example, the reconfiguration devices may enable additional panels (or modules) to be added to the respective housings 204, 404, and/or the orientation of the panels to be adjusted such that the emitters are substantially equidistant from the bond interfaces, which may provide for a more even application (or distribution) of emitted radiation across a predefined geometric dataset representative of the bond interfaces. Such a substantially evenly distributed emission profile may more evenly heat the bond interfaces, which may reduce adjustments made by the circuitry regarding the emitted radiation.

In particular, hinge 236 may enable panels 220, 228 to be disconnected from one another. A panel 602, which may include one or more additional microwave emitters, may be connected between panels 220, 228. Hinge 236 may hingedly connect panel 602 to panel 220. A hinge 604 may hingedly connect panel 602 to panel 228.

Similarly, hinge 240 may enable panels 228, 232 to be disconnected from one another. A panel 606, which may include one or more additional microwave emitters, may be connected between panels 228, 232. Hinge 240 may hingedly connect panel 606 to panel 232. A hinge 608 may hingedly connect panel 606 to panel 228.

Similarly, hinge 244 may enable panels 232, 224 to be disconnected from one another. A panel 610, which may include one or more additional microwave emitters, may be connected between panels 232, 224. Hinge 244 may hingedly connect panel 610 to panel 224. A hinge 612 may hingedly connect panel 610 to panel 232.

The hinges may be formed from dovetailed portions of the respective panels, an example of which can be seen in FIG. 7. However, apparatus 200 may include other structures or mechanisms that allow for shape reconfiguration and/or modularity of housing 204, such a mechanism that allows the panels to slide relative to one another.

As shown in FIG. 6, reconfigured apparatus 200 (as compared to apparatus 200 in FIG. 4C) now includes panel 602 in an orientation substantially parallel to a substantially horizontal portion of interface 312, panel 228 in an orientation substantially parallel to an angled portion of interface 312, panel 606 in an orientation substantially parallel to interface 354, panel 232 in an orientation substantially parallel to an angled portion of interface 316, and panel 610 in an orientation substantially parallel to a substantially horizontal portion of interface 316.

Relative positions of the emitters on the panels may be adjustable. For example, the emitters may be slidingly engaged with the panels via a track system, or other suitable mechanism, such as one or more magnets. In some embodiments, one or more of the emitters may be removably coupled to one or more of the panels, which may allow for the relative position(s) and number of emitters on the respective panels to be tailored to a specific application.

As also shown in FIG. 6, apparatus 400 may be similarly reconfigured to optimize an emission profile to bond interfaces 332, 336, 354, as apparatus 200 is to bond interfaces 312, 316, 354.

FIG. 7 shows apparatus 200 in yet another reconfigured state. This reconfigured state, among other applications, may be suitable for repairing a hat stringer 700 on a curved surface 704. Stringer 700 and surface 704 may be composite surfaces of object 40 (see FIG. 2).

A patch 708 may be placed over (or adjacent) a fault 712 in stringer 700. Fault 712 may be prepared for repair prior to placement of patch 708. The opening of housing 204 may be placed adjacent surface 704 with the opening surrounding fault 712 to form a substantially closed chamber, as is shown.

Housing 204 may include side panels 716, 718. Panels 716, 718 may be made of a flexible metal wire mesh, or other suitable substantially flexible high loss factor material. Panels 716, 718 may be configured to flexibly engage surface 704 (and the surface of stringer 700) to provide a sufficient seal to prevent microwave radiation emitted by emitters 208 from escaping the substantially closed chamber.

Panel 716 may be connected to panels 220, 224, 228, and/or 232. Panel 718 may be connected to panels 220, 224, 228, and/or 232. In some embodiments, panels 716, 718 may be connected (or removably connected) to one or more of the panels prior to housing 204 being placed on surface 704. In some embodiments, panels 716, 718 may be connected (or removably connected) to one or more of the panels after housing 204 has been placed on surface 704. In some embodiments, panels 716, 718 may include stretchable portions that enable the shape of housing 204 to be reconfigured without removal of panels 716, 718.

Lower portions of panels 220, 224 may include respective flexible portions 220b, 224b (see FIG. 3C) configured to provide a sufficient seal between surface 704 and panels 220, 224. In other embodiments, the lower portions of panels 220, 224 may be rigid but still provide a sufficient seal, as is shown in FIG. 7.

Apparatus 200 may include any suitable structure, mechanism, or device for preventing emitted radiation from escaping the closed chamber. For example, gaps between panels (e.g., between dovetailed hinge portions of the respective panels at hinges 236, 240, 244) may be configured to prevent passage of emitted microwave radiation from the closed chamber to the space outside of housing 204. For example, the hinges may be structured such that the gaps between dovetailing portions of the panels are less than a single wavelength of the emitted radiation. In some embodiments, housing 204 (e.g., all of housing 204 or portions thereof, such as the hinges) may be enclosed in wire mesh, or other suitable shielding mechanism prior to or after disposal on the surface.

In the reconfigured state of apparatus 200 shown in FIG. 7, angle $\theta 1$ has been adjusted to be less than angle $\theta 1$ in the housing configuration shown in FIG. 4C, which may provide for more evenly distributed heating along a convex bond interface (e.g., between patch 708 and stringer 700). For example, by reducing angle $\theta 1$ to a suitable angle that is less than 180 degrees, an array of emitters 208 coupled to panel 228 may be positioned approximately equidistant from a first portion 708a of patch 708, and an array of emitters 208 coupled to panel 232 may be positioned approximately equidistant from a second portion 708b of patch 708. The adjustment of angle $\theta 1$ (e.g., via operation of hinge 240) may result in an altered orientation of panel 228 relative to panel 232.

Sensor (or sensor unit) 248 may be or include one or more temperature (or heat) sensors. The one or more temperature sensors may be configured to measure a first temperature of a first location proximate fault 712. For example, sensors 248 may include a first infrared detector (or camera) 722, which may be configured to measure a temperature of the first location, which may be proximate first portion 708a of patch 708.

Sensors 248 may be configured to measure a second temperature of a second location proximate fault 712. For example, sensors 248 may include a second infrared detector (or camera) 726, which may be configured to measure a temperature of the second location, which may be proximate second portion 708b of patch 708. The first location may be spaced apart from the second location.

The one or more feedback loops, which may be implemented in circuitry 212, may be configured to modulate emission of microwave radiation from the array of emitters 208 coupled to panel 228 (e.g., all or a subset of these emitters, such as an emitter 208a) based on the first temperature, and to modulate emission of microwave radiation from the array of emitters 208 coupled to panel 228 (e.g., all or a subset of these emitters, such as an emitter 208b) based on the second temperature.

In some embodiments, a single detector may be configured to measure temperature in both the first and second locations. For example, the single detector may be a single infrared camera configured to acquire a thermal image of the bonding zone defined by housing 204 on the surface. Circuitry 212 may receive the acquired thermal image, and may associate distinct first and second regions in the image with the respective first and second locations. Circuitry 212 may modulate emissions from the array of emitters associated with panel 228 based on a temperature determined from the first region of the image, and/or may modulate emissions from the array of emitters associated with panel 232 based on a temperature determined from the second region of the image.

In some embodiments, circuitry 212 may be configured to activate different emitters 208 sequentially. Circuitry 212 may be configured to tailor the sequence and/or intensity of emission to create stronger emitted radiation in one area of the bonding zone (e.g., proximal the first location) than in another area in the bonding zone (e.g., proximal the second location).

Apparatus 200 may include any suitable mechanism, structure, or device for altering a polarity (or directionality) of microwave emissions from one or more of emitters 208. For example, apparatus 200 may include one or more polarizing mechanisms. Each polarizing mechanism may include a disc 730, as shown in FIGS. 7 and 8. Each disc may be rotatable relative to the panel to which it may be coupled. Each disc may include an elongate slot 734. Each disc 730 may be coupled to one of emitters 208, such that microwave radiation emitted by the respective emitter is emitted through the respective slot 734. Each of slots 734 may have a width that is sufficiently narrow to prevent passage of a first polarity of the emitted radiation, but may have a length that is sufficiently long to allow passage of a second polarity of the emitted radiation.

By rotating discs 730 (and thus slots 734), the emitted radiation may be tailored (and/or customized) to a particular application. For example, a particular bond interface, a particular housing configuration, and/or a particular emission frequency combination may result in one or more hot or cold spots in the bond interface produced by additive interference of the emitted radiation. To reduce such interference, one or more of the discs may be rotated to change the polarity of the emitted radiation. For example, adjacent slots 734a, 734b may be oriented relative to one another such that their respective elongate directions (or lengths) are substantially perpendicular to one another, as shown, such that the emitted radiation from slot 734a has a polarity that is substantially orthogonal to a polarity of radiation emitted from slot 734b, which may reduce interference at the bond interface due to a displacement variation from emitters 208c, 208d to the bond interface.

Example 3

This example describes an illustrative cure cycle (or process) for bonding materials, which may be used in conjunction with any of the apparatuses described herein; see FIG. 9.

FIG. 9 shows a chart of an illustrative cure cycle, generally indicated at 900. Cycle 900 may include a heat ramp-up phase 904, a dwell phase 908, and a cool down phase 912.

Prior to cycle 900, materials may be prepared to be bonded together at a bond interface in a bonding zone, which may involve preparing a damaged area and/or applying a patch. A vacuum bag, or other pressure reduction device, may be applied to the bonding zone to hold the materials together. An apparatus for bonding the materials may be used to define the bonding zone. In some embodiments, the vacuum bag may be placed over the apparatus (e.g., after the apparatus has defined the bonding zone).

Phase 904 may begin at a first predetermined temperature (e.g., of a bond interface defined between the materials), such as at 54 degrees Celsius. In some embodiments, emitted radiation from the apparatus of any of the foregoing examples may be used to heat the bond interface. In some embodiments, the materials (and/or the bond interface) may be initially heated by another source, such as a heat gun, which may be used to heat tack an adhesive layer and/or the materials in place. Phase 904 may involve increasing the temperature of the bond interface at a first predetermined rate, such as at a rate in a range of about 0.5 to 3 degrees Celsius per minute. Phase 904 may continue until the bond interface reaches a second predetermined temperature, which may be a cure (or cured) temperature of the bond interface, such as a temperature of 177 degrees Celsius plus or minus 6 degrees Celsius.

Phase 908 may begin when the bond interface reaches the second predetermined temperature. Phase 908 may involve holding or maintaining the second predetermined temperature for a predetermined duration of time, such as 150 to 210 minutes. Maintaining the second predetermined temperature for the predetermined duration of time may form a suitable bond between the materials (e.g., at the bond interface).

Phase 912 may start when the predetermined duration of time has lapsed. Phase 912 may involve decreasing the temperature of the bond interface at a second predetermined rate, such as at a rate that is less than or equal to 3 degrees Celsius per minute. The second predetermined rate may be a maximum rate at which the temperature of the bond interface can be reduced without reducing a strength of the bond. Phase 912 may continue until the bond interface reaches a third predetermined temperature, such as a temperature at or below 60 degrees Celsius. Once the bond interface has reached the third predetermined temperature, pressure inside the vacuum bag may be released, the vacuum bag and the apparatus may be removed, and the bond between the materials may be inspected.

Example 4

This example describes a method for bonding materials; see FIGS. 10-13.

Figure 10:
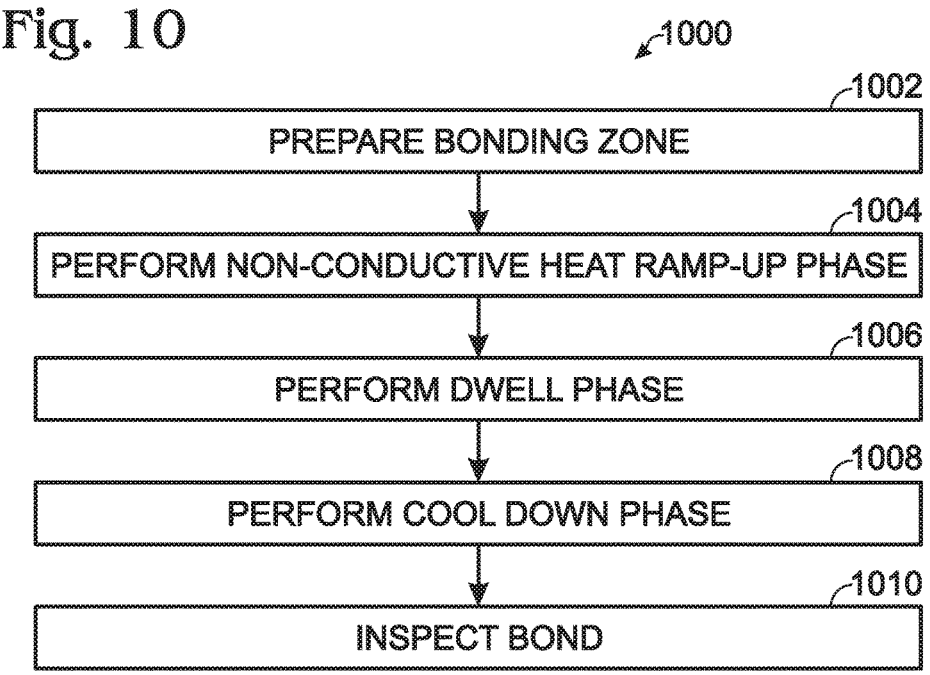
FIG. 10 is a flowchart illustrating a method for bonding materials, including a non-conductive heat ramp-up phase, a dwell phase, and a cool down phase.

FIG. 10 depicts multiple steps of a method, generally indicated at 1000, which may be performed in conjunction with an apparatus for bonding materials according to aspects of the present disclosure. Although various steps of method 1000 are described below and depicted in FIG. 10, the steps need not necessarily all be performed, and in some cases may be performed in a different order than the order shown.

Method 1000 may include a step 1002 of preparing a bonding zone. At step 1002, a surface feature of an object may be prepared to be bonded with a new surface feature. The surface feature may be a fault in the object, or may be a region without a fault. Preparing the surface feature may involve removing a portion of material from the object, applying the new surface feature to the (existing) surface feature of the object, and/or vacuum bagging and depressurizing a region in which the new surface feature is disposed to hold together the new surface feature and the surface feature of the object. At step 1002, an apparatus may be applied to the object to define the bonding zone. The apparatus may include a non-conductive, non-convective heating device, such as one or more microwave emitters, and a spacing mechanism and a shielding mechanism, such as a housing made of a high loss material to which the heating device is coupled.

Method 1000 may include a step 1004 of performing a non-conductive heat ramp-up phase, a step 1006 of performing a dwell phase, and a step 1008 of performing a cool down phase (e.g., similar to phases 904, 908, 912 shown in FIG. 9). At step 1004, the apparatus may be configured and/or operated to increase at a first rate a temperature of a bond interface between the surface feature of the object and the new surface feature until the temperature of the bond interface reaches a first predetermined temperature (e.g., see phase 904 of FIG. 9). The first predetermined temperature may be a cured temperature of the bond interface. At step 1006, the apparatus may be configured and/or operated to maintain a temperature of the bond interface at (or around) the first predetermined temperature for a predetermined duration of time (e.g., see phase 908 of FIG. 9). At step 1008, the apparatus may be configured and/or operated to allow the temperature of the bond interface to decrease at a second predetermined rate until the bond interface reaches a second predetermined temperature (e.g., see phase 912 of FIG. 9).

Method 1000 may include a step 1010 of inspecting a bond formed between the material (e.g., the new surface feature and the surface feature of the object). At step 1010, a user may remove the apparatus from the surface of the object, remove the vacuum bag, and inspect the bond to see if the apparatus has adequately heated the bond interface to provide a desirable cure.

FIG. 11 is an illustration of operations, generally indicated at 1100, which may be performed by one embodiment of a feedback loop for the non-conductive heat ramp-up phase. This feedback loop may be implemented in circuitry of the apparatus.

Operations 1100 may include a step 1102 of acquiring a surface temperature reading. The surface temperature reading may include a measurement of the surface temperature of the surface feature of the object and/or the new surface feature, which may be proximate the bond interface. One or more temperature sensors of the apparatus may acquire the surface temperature reading. A controller, or other suitable circuitry of the apparatus, may receive the surface temperature reading from the one or more temperature sensors.

Operations 1100 may include a step 1104 of converting the surface temperature to an inner ply temperature. The one or more microwave emitters may non-conductively and non-convectively heat the bond interface via directed microwave radiation. The microwave radiation may directly excite molecular structures in a bond portion (e.g., an adhesive) of the bond interface, which may be in a non-exposed location. For example, bond interface 354 in FIG. 4C may correspond to a location of an inner ply of the bond interface that is non-exposed. Excitation of the molecular structures in this non-exposed location may produce heat which may be conductively transmitted to other portions of the bond interface. Heat conductively transmitted to exposed portions of the bond interface (e.g., the horizontal portion of bond interface 312 in FIG. 4C), may be convectively dissipated. However, heat conductively transmitted to other non-exposed portions of the bond interface (e.g., a lower segment of the angled portion of bond interface 312 in FIG. 4C) may not be convectively dissipated, which may result in the inner ply temperature being higher than the surface temperature. At step 1104, the circuitry of the apparatus (e.g., the controller, and/or a data processing system) may determine the inner ply temperature based on the measured surface temperature. The determined inner ply temperature may be an estimate, based on one or more factors, such as bond interface topography, a depth of the bond interface, and/or compositions of the materials being bonded. The circuitry may determine the inner ply temperature by accessing a conversion table. The conversion table may associate specific surface temperatures with specific predetermined inner ply temperatures.

Operations 1100 may include a step 1106 of determining whether the inner ply temperature is equal to (or has reached) the cured temperature. In some examples, the cured temperature may be around 177 degrees Celsius. In other examples, the cured temperature may be around 121 degrees Celsius. At step 1106, the circuitry of the apparatus may determine whether the inner ply temperature is equal to (or has reached) the cured temperature. If it is determined that the inner ply temperature has reached the cured temperature, then operations 1100 may flow to a step 1108 of proceeding to the dwell phase (e.g., see phase 908 in FIG. 9, and step 1006 in FIG. 10).

However, if it is determined at step 1106 that the inner ply temperature is not equal to (e.g., is less than) the cured temperature, then operations 1100 may proceed to a step 1110. At step 1110, the circuitry may determine whether an inner ply temperature rate increase is less than a first predetermined threshold rate, such as 0.5 degrees Celsius per minute. If it is determined at step 1110 that the rate increase is less than the first predetermined threshold rate, then operations 1100 may proceed to a step 1112 of increasing power to one or more of the microwave emitters, and may return to step 1102. If it is determined at step 1110 that the rate increase is not less than the first predetermined threshold rate, then operations 1100 may proceed to a step 1114.

At step 1114, the circuitry may determine whether the inner ply temperature rate increase is greater than a second predetermined threshold rate, such as 3 degrees Celsius per minute. If it is determined at step 1114 that the inner ply temperature rate increase is not greater than the second predetermined threshold rate, then operations 1100 may return to step 1102. However, if it is determined at step 1114 that the inner ply temperature rate increase is greater than the second predetermined threshold rate, then operations 1100 may proceed to a step 1116 of decreasing power to one or more of the microwave emitters, and may return to step 1102.

FIG. 12 is an illustration of operations, generally indicated at 1200, which may be performed by one embodiment of a feedback loop for the dwell phase. This feedback loop may be implemented in the circuitry of the apparatus.

Operations 1200 may include a step 1202 of acquiring a surface temperature reading, and a step 1204 of converting the acquired surface temperature to an inner ply temperature. Step 1202 may be similar to step 1102 of operations 1100. Step 1204 may be similar to step 1104 of operations 1100.

Operations 1200 may include a step 1206 of determining whether the inner ply temperature is less than a lower threshold temperature. The lower threshold temperature may be the cured temperature (or a lower predetermined temperature in a range of temperatures at which the bond interface may be properly cured). If it is determined at step 1206 that the inner ply temperature is less than the lower threshold temperature, then operations 1200 may proceed to a step 1208 of increasing power to one or more of the microwave emitters, and may return to step 1202.

However, it is determined at step 1206 that the inner ply temperature is not less than the lower threshold temperature, then operations 1200 may proceed to a step 1210 of determining whether an elapsed time in the dwell phase has reached (or is equal to) a predetermined duration of dwell time. The predetermined duration of dwell time may be a duration of dwell time that is required for the bond interface to be properly cured.

If it is determined at step 1210 that the elapsed time has not reached the predetermined duration, then operations 1200 may proceed to a step 1212 of determining whether the inner ply temperature is greater than an upper threshold temperature. The upper threshold temperature may be an upper predetermined temperature in a range of temperatures at which the bond interface may be properly cured. If it is determined at step 1212 that the inner ply temperature is greater than the upper threshold temperature, then operations 1200 may proceed to a step 1214 of decreasing power to one or more of the microwave emitters, and return to step 1202. However, if it is determined at step 1212 that the inner ply temperature is not greater than the upper threshold temperature, then operations may return to step 1202 (e.g., without decreasing power to one or more of the microwave emitters).

At step 1210, if it is determined that the elapsed time has reached the predetermined duration, then operations 1200 may flow to a step 1216 of proceeding to the cool down phase (e.g., see phase 912 in FIG. 9, and step 1008 in FIG. 10).

FIG. 13 is an illustration of operations, generally indicated at 1300, which may be performed by one embodiment of a feedback loop for the cool down phase. This feedback loop may be implemented in the circuitry of the apparatus.

Operations 1300 may include a step 1302 of acquiring a surface temperature reading, and a step 1304 of converting the acquired surface temperature to an inner ply temperature. Step 1302 may be similar to step 1102 of operations 1100. Step 1304 may be similar to step 1104 of operations 1100.

Operations 1300 may include a step 1306 of determining whether an inner ply temperature rate decrease is less than a third predetermined threshold rate. The third predetermined threshold rate may be a rate at which the inner ply temperature may decrease without damaging the cured bond. For example, the third predetermined threshold rate may be 3 degrees Celsius per minute. If it is determined at step 1306 that the inner ply temperature rate decrease is not less than the third predetermined threshold rate, then operations 1300 may proceed to a step 1308 of decreasing power to one or more of the microwave emitters, and may return to step 1302. However, if it is determined at step 1306 that the inner ply temperature decrease is not less than the third predetermined threshold rate, then operations 1300 may proceed to a step 1310 of determining whether the inner ply temperature is less than or equal to a suitably cool temperature, such as 60 degrees Celsius. The suitably cool temperature may be a temperate at or below which the temperature of the cured bond interface can decrease at a rate greater than the third predetermined threshold rate without causing damage to the cured bond.

At step 1310, if it is determined that the inner ply temperature is not less than or equal to the suitably cool temperature, then operations 1300 may return to step 1302. However, if it is determined at step 1310 that the inner ply temperature is less than or equal to the suitably cool temperature, then operations 1300 may proceed to a step 1312 of turning off power to the one or more microwave emitters.

Example 5

This example describes another method for bonding materials; see FIG. 14.

FIG. 14 depicts multiple steps of a method, generally indicated at 1400, which may be performed in conjunction with an apparatus for bonding materials according to aspects of the present disclosure. Although various steps of method 1400 are described below and depicted in FIG. 14, the steps need not necessarily all be performed, and in some cases may be performed in a different order than the order shown.

Method 1400 may include a step 1402 of defining a bond interface between two materials in a cure zone on a surface of an object. A patch may be created by bonding together multiple plies of composite material. At step 1402, a surface feature of the object may be prepared to be bonded with the patch. Preparation of the surface feature may involve sanding, grinding, or otherwise removing some material from the surface feature. The surface feature may be associated with the surface and may be one of the two materials. The surface feature may include an indentation in the surface. The surface feature may include a hole through a wall. The patch may be the other of the two materials. Defining the bond interface may include applying a thermo-setting adhesive between the patch and the prepared surface feature.

Method 1400 may include a step 1404 of non-conductively heating the bond interface without directly heating the surface outside of the cure zone. For example, the cure zone may be enclosed with a housing configured to isolate the cure zone from the surface of the object outside of the cure zone, and from the space surrounding the housing. Enclosing the cure zone may involve adjusting a shape of the housing, and sealing a flexible portion of the housing against a curved portion of the surface of the object. Heating the bond interface may involve applying microwave radiation to the bond interface. Applying the microwave radiation may involve emitting the microwave radiation from multiple microwave emitters coupled to the housing.

Method 1400 may include a step 1406 of determining a temperature in a location in the bond zone, and modifying a heating effect at the location in response to the determined temperature. For example, step 1406 may involve determining a temperature of the bond interface with a temperature sensor, and modulating emission of microwave radiation from at least a subset of the microwave emitters based on the determined temperature.

Example 6

This example describes another method for bonding materials; see FIG. 15.

FIG. 15 depicts multiple steps of a method, generally indicated at 1500, which may be performed in conjunction with an apparatus for bonding materials according to aspects of the present disclosure. Although various steps of method 1500 are described below and depicted in FIG. 15, the steps need not necessarily all be performed, and in some cases may be performed in a different order than the order shown.

Method 1500 may include a step 1502 of defining a bonding zone on a surface of an object. The surface may include a deformity to be repaired. The surface may be the surface of a pre-existing composite material. The pre-existing composite material may have been previously cured.

Method 1500 may include a step 1504 of providing a patch material adjacent the deformity. The patch may include matrix material and/or reinforcement material. The patch material provided adjacent the deformity may be in a cured state, or may be in a non-cured state.

Method 1500 may include a step 1506 of applying a housing to the bonding zone. The housing may include an inner side, and an opening to the inner side. The housing may include at least one microwave emitter on the inner side of the housing. The housing may be configured to prevent microwave emitter radiation from reaching the surface outside of the bonding zone. For example, the housing may be made of a high loss factor material. Applying the housing to the bonding zone may involve coupling (e.g., positioning) the opening adjacent the surface. Applying the housing to the bonding zone may involve directing the at least one microwave emitter toward the bonding zone.

Optionally, method 1500 may include a step 1508 of configuring a shape of the housing to optimize an emissions profile. For example, multiple microwave emitters may be coupled to the housing, and a bond interface may be defined between the deformity and the patch material, in which case, configuring the shape of the housing may involve tailoring an arrangement and/or geometry of the emitters to substantially match a topography of the bond interface.

Method 1500 may include a step 1510 of emitting microwave radiation to the bonding zone until the patch is suitably bonded to the object. Suitably bonding the patch to the object may involve emitting microwave radiation from the at least one microwave emitter to the bonding zone to perform a heat ramp-up phase, a dwell phase, and a cool down phase on the bond interface. In some embodiments, emitting microwave radiation to the bonding zone may include applying microwave radiation having a first polarity to a first location in the bonding zone, and applying microwave radiation having a second polarity to a second location in the bonding zone. The first polarity may be different than (e.g., substantially orthogonal to) the second polarity.

Example 7

This example describes a data processing system 1600 in accordance with aspects of the present disclosure. In this example, data processing system 1600 is an illustrative data processing system for implementing one or more of the operations and/or functions in FIGS. 1-15 and/or described in relation thereto; see FIG. 16.

In this illustrative example, data processing system 1600 includes communications framework 1602. Communications framework 1602 provides communications between processor unit 1604, memory 1606, persistent storage 1608, communications unit 1610, input/output (I/O) unit 1612, and display 1614. Memory 1606, persistent storage 1608, communications unit 1610, input/output (I/O) unit 1612, and display 1614 are examples of resources accessible by processor unit 1604 via communications framework 1602.

Processor unit 1604 serves to run instructions for software that may be loaded into memory 1606. Processor unit 1604 may be a number of processors, a multi-processor core, or some other type of processor, depending on the particular implementation. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and other suitable information either on a temporary basis or a permanent basis.

Storage devices 1616 also may be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output (I/O) unit 1612 allows for input and output of data with other devices that may be connected to data processing system 1600. For example, input/output (I/O) unit 1612 may provide a connection for user input through a keyboard, a mouse, and/or some other suitable input device. Further, input/output (I/O) unit 1612 may send output to a printer. Display 1614 provides a mechanism to display information to a user.

Instructions for the operating system, applications, and/or programs may be located in storage devices 1616, which are in communication with processor unit 1604 through communications framework 1602. In these illustrative examples, the instructions are in a functional form on persistent storage 1608. These instructions may be loaded into memory 1606 for execution by processor unit 1604. The processes of the different embodiments may be performed by processor unit 1604 using computer-implemented instructions, which may be located in a memory, such as memory 1606.

These instructions are referred to as program instructions, program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples. In one example, computer readable media 1620 may be computer readable storage media 1624 or computer readable signal media 1626.

Computer readable storage media 1624 may include, for example, an optical or magnetic disk that is inserted or placed into a drive or other device that is part of persistent storage 1608 for transfer onto a storage device, such as a hard drive, that is part of persistent storage 1608. Computer readable storage media 1624 also may take the form of a persistent storage, such as a hard drive, a thumb drive, or a flash memory, that is connected to data processing system 1600. In some instances, computer readable storage media 1624 may not be removable from data processing system 1600.

In these examples, computer readable storage media 1624 is a physical or tangible storage device used to store program code 1618 rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different illustrative embodiments may be implemented in a data processing system including components in addition to and/or in place of those illustrated for data processing system 1600. Other components shown in FIG. 16 can be varied from the illustrative examples shown. The different embodiments may be implemented using any hardware device or system capable of running program code. As one example, data processing system 1600 may include organic components integrated with inorganic components and/or may be comprised entirely of organic components excluding a human being. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1618 may be omitted, because the processes for the different embodiments are implemented in a hardware unit.

In still another illustrative example, processor unit 1604 may be implemented using a combination of processors found in computers and hardware units. Processor unit 1604 may have a number of hardware units and a number of processors that are configured to run program code 1618. With this depicted example, some of the processes may be implemented in the number of hardware units, while other processes may be implemented in the number of processors.

In another example, a bus system may be used to implement communications framework 1602 and may be comprised of one or more buses, such as a system bus or an input/output bus. Of course, the bus system may be implemented using any suitable type of architecture that provides for a transfer of data between different components or devices attached to the bus system.

Additionally, communications unit 1610 may include a number of devices that transmit data, receive data, or both transmit and receive data. Communications unit 1610 may be, for example, a modem or a network adapter, two network adapters, or some combination thereof. Further, a memory may be, for example, memory 1606, or a cache, such as that found in an interface and memory controller hub that may be present in communications framework 1602.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the Figures. For example, the functions of two blocks shown in succession may be executed substantially concurrently, or the functions of the blocks may sometimes be executed in the reverse order, depending upon the functionality involved.

Manner of Operation/Use

In one example, a damaged area may be identified on a surface of a composite material of an object, such as an airplane, a bicycle, or other object. The damaged area may be prepared for repair by removing a portion of the composite material from the damaged area. A patch may be applied to the prepared damaged area. A vacuum bag may be used to evacuate a space in which the patch and the prepared damaged area are disposed. An apparatus including a housing and one or more microwave emitters on the inner side of the housing may be mounted to the surface of the object, such that an opening to the inner side of the housing is adjacent the surface and surrounds the fault, and the housing and the surface of the object form a substantially closed chamber. The apparatus may be operated to emit microwave radiation from the one or more microwave emitters to a bond interface between the patch and prepared damaged area. The housing may be configured to substantially contain the emitted radiation within the closed chamber. Circuitry of the apparatus may adjust the emitted radiation to control a temperature of the bond interface in a heat ramp-up phase, a dwell phase, and a cool down phase to suitably bond the patch to the prepared damaged surface. The circuitry may indicate to a technician when the cool down phase has been complete. The technician may remove the apparatus from the surface, remove the vacuum bag, and inspect the bond between the patch and the object.

Alternatively, the apparatus may be used to bond any composite materials for any purpose, such as constructing new articles of manufacture, such as on an assembly line.

Advantages, Features, Benefits

The different embodiments described herein provide several advantages over known solutions for bonding materials. For example, the illustrative embodiments described herein allow a bond interface between an existing surface feature of an object and a new surface feature to be heated directly via directed microwave radiation, rather than conductively, which may provide for improved control of bond interface temperature, improved heat distribution along the bond interface, a reduction of misplaced heating, improved heating speeds, shortened cure times, and/or prevention of thermal runaways. However, not all embodiments described herein provide the same advantages or the same degree of advantage.

CONCLUSION

The disclosure set forth above may encompass multiple distinct disclosures with independent utility. Although each of these disclosures has been disclosed in its preferred form(s), the specific embodiments thereof as disclosed and illustrated herein are not to be considered in a limiting sense, because numerous variations are possible. The subject matter of the disclosures includes all novel and nonobvious combinations and subcombinations of the various elements, features, functions, and/or properties disclosed herein. The following claims particularly point out certain combinations and subcombinations regarded as novel and nonobvious. Disclosures embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the disclosures of the present disclosure.

We claim:

1. An apparatus for bonding materials, comprising:
   a housing having an inner side and an opening;
   a plurality of microwave emitters on the inner side of the housing, wherein the housing is configured for mounting on a surface having a fault requiring repair, the housing including a flexible portion proximate the opening of the housing, the flexible portion configured to be adjacent the surface and to surround the fault so that the housing and the surface form a closed chamber;
   a temperature sensor configured to determine a temperature of the surface proximate the fault; and
   a controller configured to modulate emission of microwave radiation from the plurality of microwave emitters based on the temperature of the surface proximate the fault.

2. The apparatus of claim 1, wherein the fault requiring repair has a first shape and the housing has a second shape that is adjustable to correspond to the first shape of the fault requiring repair.

3. The apparatus of claim 1, wherein the opening of the housing is adjustable.

4. The apparatus of claim 1, wherein the housing includes one or more flexible panel portions configured to flexibly engage the surface to provide a seal sufficient to prevent microwave radiation emitted by the one or more emitters from escaping the closed chamber.

5. The apparatus of claim 1, wherein the housing includes at least first and second panels, the first panel including a first microwave emitter of the plurality of microwave emitters, the second panel including a second microwave emitter of the plurality of microwave emitters, the apparatus further comprising a reconfiguration device for altering an orientation of the first panel relative to the second panel.

6. The apparatus of claim 5, wherein the reconfiguration device includes a hinge connecting the first panel to the second panel.

7. The apparatus of claim 5, wherein the controller is configured to selectively power the first and second microwave emitters.

8. The apparatus of claim 7, wherein the temperature sensor is configured to measure a first temperature of a first location proximate the fault, and to measure a second temperature of a second location proximate the fault, the first location being spaced apart from the second location.

9. The apparatus of claim 8, wherein the first microwave emitter is directed toward the first location and the second microwave emitter is directed toward the second location, the apparatus further comprising one or more feedback loops for modulating emission of microwave radiation from the first microwave emitter based on the first temperature, and for modulating microwave radiation from the second microwave emitter based on the second temperature.

10. The apparatus of claim 1, wherein the temperature sensor is an infrared camera.

11. An apparatus for bonding materials, comprising:
a housing, having an inner side and an opening, the housing including a first panel and a second panel; and
a plurality of microwave emitters on the inner side of the housing, wherein the housing is configured for mounting on a surface having a fault requiring repair, the opening of the housing being adjacent the surface and surrounding the fault, the housing and the surface forming a substantially closed chamber, the fault including a first sub-interface and a second sub-interface, non-coplanar with each other; and
wherein the first panel is adjustable to be substantially parallel to the first sub-interface and the second panel is adjustable to be substantially parallel to the second sub-interface.

12. The apparatus of claim 11, further comprising:
a temperature sensor configured to determine a temperature of the surface proximate the fault.

13. The apparatus of claim 12, further comprising:
a controller configured to modulate emission of microwave radiation from the plurality of microwave emitters based on the temperature of the surface proximate the fault.

14. The apparatus of claim 13, wherein the first panel includes a first microwave emitter of the plurality of microwave emitters, the second panel includes a second microwave emitter of the plurality of microwave emitters, and the apparatus further comprises a reconfiguration device for altering an orientation of the first panel relative to the second panel.

15. The apparatus of claim 14, wherein the controller is configured to selectively power the first and second microwave emitters.

16. The apparatus of claim 15, wherein the temperature sensor is configured to measure a first temperature of a first location proximate the fault, and to measure a second temperature of a second location proximate the fault, the first location being spaced apart from the second location.

17. The apparatus of claim 16, wherein the first microwave emitter is proximate the first location and the second microwave emitter is proximate the second location, the apparatus further comprising one or more feedback loops for modulating emission of microwave radiation from the first microwave emitter based on the first temperature, and for modulating microwave radiation from the second microwave emitter based on the second temperature.

18. The apparatus of claim 11, wherein the housing is configured for selective size adjustment of the opening.

19. The apparatus of claim 11, wherein the housing further includes one or more flexible portions proximate the opening of the housing, the one or more flexible portions configured to flexibly engage the surface to provide a seal sufficient to prevent microwave radiation emitted by the one or more emitters from escaping the substantially closed chamber.

* * * * *